(12) United States Patent
Chiang et al.

(10) Patent No.: US 11,916,231 B2
(45) Date of Patent: Feb. 27, 2024

(54) ELECTROCHEMICAL MATERIALS INCLUDING SOLID AND LIQUID PHASES

(71) Applicants: Massachusetts Institute of Technology, Cambridge, MA (US); Carnegie Mellon University, Pittsburgh, PA (US)

(72) Inventors: Yet-Ming Chiang, Weston, MA (US); Richard Park, Somerville, MA (US); Venkatasubramanian Viswanathan, Pittsburgh, PA (US); Shashank Sripad, Pittsburgh, PA (US); Zijian Hong, Pittsburgh, PA (US); Pinwen Guan, Pittsburgh, PA (US)

(73) Assignees: Massachusetts Institute of Technology, Cambridge, MA (US); Carnegie Mellon University, Pittsburgh, PA (US)

(*) Notice: Subject to any disclaimer, the term of this patent is extended or adjusted under 35 U.S.C. 154(b) by 299 days.

(21) Appl. No.: 16/852,308

(22) Filed: Apr. 17, 2020

(65) Prior Publication Data
US 2020/0403234 A1    Dec. 24, 2020

Related U.S. Application Data

(60) Provisional application No. 62/863,144, filed on Jun. 18, 2019.

(51) Int. Cl.
| | |
|---|---|
| *H01M 4/40* | (2006.01) |
| *H01M 10/0525* | (2010.01) |
| *H01M 10/36* | (2010.01) |
| *H01M 10/44* | (2006.01) |

(52) U.S. Cl.
CPC ....... *H01M 4/405* (2013.01); *H01M 10/0525* (2013.01); *H01M 10/36* (2013.01); *H01M 10/44* (2013.01); *H01M 2250/20* (2013.01)

(58) Field of Classification Search
None
See application file for complete search history.

(56) References Cited

U.S. PATENT DOCUMENTS

| | | |
|---|---|---|
| 3,773,558 A | 11/1973 | Charbonnier et al. |
| 4,877,695 A | 10/1989 | Cipriano et al. |
| 8,642,201 B2 | 2/2014 | Cheng et al. |

(Continued)

OTHER PUBLICATIONS

International Search Report and Written Opinion for PCT/US2020/028744 dated Oct. 19, 2020.

(Continued)

*Primary Examiner* — Brian R Ohara
*Assistant Examiner* — Patrick Marshall Greene
(74) *Attorney, Agent, or Firm* — Wolf, Greenfield & Sacks, P.C.

(57) ABSTRACT

Electrochemical devices, and associated materials and methods, are generally described. In some embodiments, an electrochemical device comprises an electroactive material. The electroactive material may comprise an alloy having a solid phase and a liquid phase that co-exist with each other. As a result, such a composite electrode may have, in some cases, the mechanical softness to permit both high energy densities and an improved current density as compared to, for example, a substantially pure metal electrode.

25 Claims, 20 Drawing Sheets

(56) References Cited

U.S. PATENT DOCUMENTS

| | | | |
|---|---|---|---|
| 9,269,997 B2 | 2/2016 | Peled et al. | |
| 9,929,432 B2 | 3/2018 | Liu et al. | |
| 2016/0156068 A1* | 6/2016 | Burke | H01M 10/399 429/103 |
| 2018/0083274 A1 | 3/2018 | Martin | |
| 2019/0165423 A1* | 5/2019 | Andre | H01M 10/0562 |
| 2022/0140389 A1* | 5/2022 | Liu | H01M 10/056 429/492 |

OTHER PUBLICATIONS

Guo et al., A Self-Healing Room-Temperature Liquid-Metal Anode for Alkali-Ion Batteries. Advanced Functional Materials. 2018;28:1804649. 8 pages.

International Preliminary Report on Patentability for PCT/US2020/028744 dated Dec. 30, 2021.

McBride et al., One-dimensional chain melting in incommensurate potassium. Phys. Rev. B. 2015; 91: 144111-8.

Monroe et al., The impact of elastic deformation on deposition kinetics at lithium/polymer interfaces. J. Electrochem. Soc. 2005; 152(2): A396-404. Epub Jan. 11, 2005.

Moruzzi et al., Calculated thermal properties of metals. Phys Rev B Condens Matter. Jan. 15, 1988;37(2):790-799.

Sharafi et al., Controlling and correlating the effect of grain size with the mechanical and electrochemical properties of $Li_7La_3Zr_2O_{12}$ solid-state electrolyte. J. Mater. Chem. A. 2017; 5:21491-504.

Wang et al., A phase-field model integrating reaction-diffusion kinetics and elasto-plastic deformation with application to lithiated selenium-doped germanium electrodes. Int. J. Mech. Sci. 2018; 144: 158-71. Epub May 19, 2018.

Extended European Search Report dated May 23, 2023, for Application No. EP20827684.

Zhang et al., A novel rechargeable potassium-sulfur battery based on liquid alloy anode. Mater Lett 2019; 242: 5-8.

EP20827684.0, May 24, 2023, Extended European Search Report.

* cited by examiner

US 11,916,231 B2

ELECTROCHEMICAL MATERIALS INCLUDING SOLID AND LIQUID PHASES

RELATED APPLICATIONS

This application claims the benefit under 35 U.S.C. 119(e) of U.S. Provisional Application No. 62/863,144, filed Jun. 18, 2019, the disclosure of which is incorporated herein by reference in its entirety.

GOVERNMENT SPONSORSHIP

This invention was made with Government support under DE-SC0002633 and DE-EE0007810 awarded by the U.S. Department of Energy. The Government has certain rights in the invention.

TECHNICAL FIELD

Electrochemical devices related to the use of electrochemical materials including solid and liquid phases, as well as associated materials and methods, are generally described.

BACKGROUND

Increasing the energy density and rate of charge/discharge of lithium-ion (Li-ion) batteries is important for accelerating the adoption of such batteries into a wide array of applications, including transportation (e.g., electric vehicles) and grid-storage (e.g., electrical power grids). Lithium metal based anodes offer a route to an improved energy density, but the plating (e.g., charging) current density is limited, for example, below about 1 mA/cm$^2$. Such limitations prevent the use of high areal capacity cathodes, therefore leading to batteries with a limited energy density and poor charging time.

SUMMARY

Electrochemical devices, and associated materials and methods, are generally described. The subject matter of the present disclosure involves, in some cases, interrelated products, alternative solutions to a particular problem, and/or a plurality of different uses of one or more devices, materials, and/or methods.

In certain embodiments, an electrochemical device is described. According to some embodiments, the electrochemical device comprises an electrode comprising an alloy, wherein the alloy comprises at least one alkali metal and the alloy has a solid phase and a liquid phase at a temperature between or equal to 15° C. and 30° C.

In some embodiments, an electroactive material is described. According to certain embodiments, the electroactive material comprises an alloy comprising at least two alkali metals, wherein the alloy has a solid phase and a liquid phase at a temperature between or equal to 15° C. and 30° C.

In certain embodiments, a method of operating an electrochemical device is described. According to some embodiments, the method comprises charging and/or discharging an electrochemical device at a first temperature, wherein at least one electrode of the electrochemical device comprises an alloy with a solid phase and a liquid phase at the first temperature.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
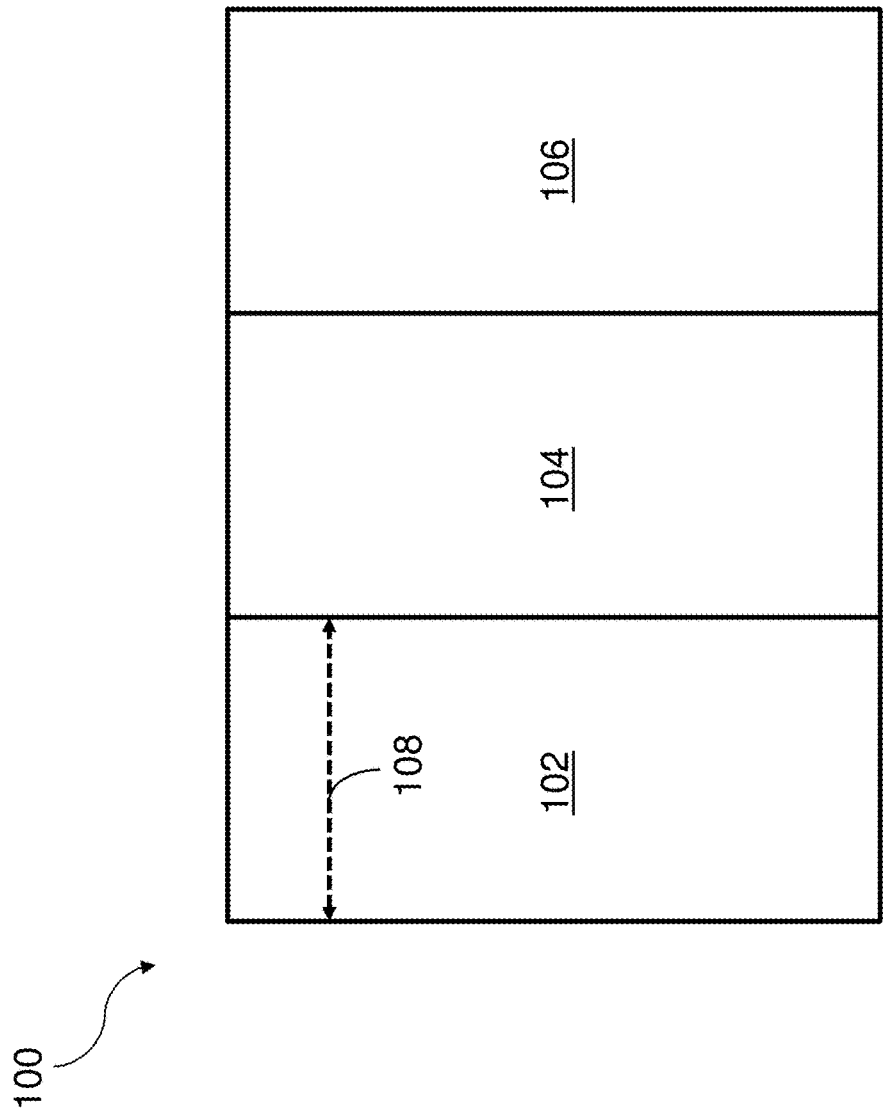
FIG. 1 shows, according to certain embodiments, a cross-sectional schematic diagram of an electrochemical device.

The Inventors have realized and appreciated that mechanically soft metal electrodes offer a route to improving the critical current density of an electrode. In some embodiments, an electrochemical device (e.g., a rechargeable battery) is described that comprises an electrode comprising an alloy used as an electrochemical material of the electrode. The alloy may, in certain embodiments, have both a solid phase and liquid phase of the metallic alloy at a temperature range at which the electrochemical device is stored and/or utilized. Such a temperature may be, for example, at or near room temperature (e.g., between or equal to about 15° C. and 30° C., though other temperatures both higher and lower than this range may be used). In certain embodiments, the solid phase comprises a first composition of one or more alkali metals and the liquid phase comprises a different second composition of one or more alkali metals. For example, in some non-limiting embodiments, the solid phase may have a composition with a larger percentage of a first alkali metal (e.g., lithium) and the liquid phase may have a composition with a larger percentage of a second alkali metal (e.g., sodium or potassium). In other, non-limiting embodiments, the solid phase and the liquid phase may include different proportions of the same alkali metal(s). Since alkali metals such as sodium and potassium have a markedly lower yield stress than lithium, an alloy containing lithium combined with sodium and/or potassium, for example, may be mechanically soft, but capable of achieving high critical current densities. As a result, such a composite electrode may have, in some cases, the mechanical softness to permit both a desired energy density and an improved current density as compared to, for example, a substantially pure alkali metal (e.g., pure lithium) electrode.

Without wishing to be bound by theory, one obstacle towards the realization of batteries with high energy densities over continuous cycles is the mechanically unstable interface between an electrode and an electrolyte under standard electrodeposition rates. In some cases, for example, some conventional electrochemical devices with solid electrodes have a maximum sustainable current density (e.g., ~1 mA/cm$^2$) that does not allow devices containing electrodes with high area capacities to be cycled at the rates desirable for applications such as electric vehicles. Furthermore, conventional electrochemical devices employing a Li-containing electrode (e.g., anode) typically produce metal dendrites under the current densities used during charge and/or discharge of a device. Such dendrites may propagate at surface cracks in the electrochemical device, thereby inducing unwanted side reactions that may reduce the energy density of the device and/or cause electrode shorting.

In view of the above, the Inventors have recognized the benefits associated with the use of electroactive materials including alloys comprising at least one alkali metal. According to some embodiments, alloying the alkali metal with one or more elements may change the chemical and/or mechanical properties of the alkali metal. In certain embodiments, for example, the at least one alkali metal may be alloyed with an element that lowers the hardness, yield stress, creep stress, and/or melting point of at least a portion of the alkali metal. In some embodiments, the at least one alkali metal may be alloyed with an element that increases the softness, ductility, and/or creep rate of at least a portion of the alkali metal. It should be understood that metallic softness/hardness, yield stress, creep stress, melting point, ductility, and/or creep rate are chemical and/or mechanical properties that would be understood by a person of ordinary skill in the art. According to certain embodiments, the at least one alkali metal may be alloyed with a mass isotope of the at least one alkali metal, resulting in an alloy comprising the at least one alkali metal enriched beyond the naturally-occurring distribution of isotopes. In some embodiments, the mass isotope of the at least one alkali metal is $^6$Li.

In some embodiments, the alloy comprises more than one alkali metal (e.g., two alkali metals, three alkali metals, etc.). For example, in certain embodiments, the alloy comprises lithium (Li), sodium (Na), potassium (K), rubidium (Rb), and/or cesium (Cs). The lithium may be $^6$Li and/or $^7$Li, in some embodiments. Other isotopes of additional alkali metals may also be contemplated.

In certain embodiments, the alloy comprises an alkali metal alloyed with a non-alkali metal. For example, in certain embodiments, the alloy may comprise gallium (Ga), indium (In), tin (Sn), lead (Pb), bismuth (Bi), and/or mercury (Hg). Examples of eutectic mixtures that may be included in the alloy are Ga—In—Sn (e.g., Galinstan) and/or Cs—Na—K. The Inventors have further recognized the benefits associated with the use of electroactive materials for an electrode of an electrochemical device having both a solid phase and a liquid phase of a metal alloy system in a desired range of operating temperatures. In certain embodiments, the solid phase of the alloy comprises one or more alkali metals. For example, in some embodiments, the solid phase of the alloy may comprises Li, Na, and/or K. In certain embodiments, the liquid phase of the alloy comprises one or more alkali metals. For example, in some embodiments, the liquid phase of the alloy comprises Li, Na, and/or K. According to certain embodiments, a composition of at least one of the elemental components of the alloy varies between the solid phase and the liquid phase. For instance, in one specific embodiment, a solid phase of the alloy may have a higher molar percentage of an electroactive component of the electroactive material as compared to the liquid phase. A Li-ion based device, for example, might use a material with a higher molar percentage of Li in the solid phase as compared to the liquid phase, which may include a higher concentration of Na and/or K. Similarly, larger percentages of Na, K, or any other appropriate electroactive component may be present in the solid phase of an electroactive material where those materials are used as the electroactive component of the alloy.

In some embodiments, a component of a liquid phase may have a reduced solubility in the solid phase of an alloy forming an electrode of an electrochemical device. For example, in such an embodiment, at least one alkali metal of the solid phase may be different than at least one alkali metal of the liquid phase or at least exhibit a lower concentration in the liquid phase. For instance, the solid phase of the alloy may comprise Li and/or Na, and the liquid phase of the alloy comprises K. In another non-limiting embodiments, the solid phase of the alloy comprises Li and/or K, and the liquid phase of the alloy comprises Na. In yet another non-limiting embodiment, the solid phase of the alloy comprises Na and/or K and the liquid phase of the alloy comprises Li. In yet another non-limiting embodiment, the solid phase of the alloy comprises Li, and the liquid phase of the ally comprises Na and/or K. In yet another non-limiting embodiment, the solid phase of the alloy comprises Na, and the liquid phase of the alloy comprises Li and/or K. In yet another non-limiting embodiment, the solid phase of the alloy comprises K, and the liquid phase of the alloy comprises Li and/or Na.

When operating the device at a set temperature, the relative amounts of a solid phase and liquid phase of an alloy may change depending on the composition of the alloy. Accordingly, due to the concentration of an electroactive component within an overall electrode changing throughout the charge and discharge cycle of an electroactive material due to the transfer of ions between an anode and cathode of a device, the overall ratio of the solid and liquid phases may change depending on the state of charge of an electroactive material, which is explained in greater detail below.

Depending on the desired operating parameters, the composition of an electrode's alloy may be selected to provide any desired operating range of solid to liquid during a charge discharge cycle of an electrochemical device. For example, during nominal operation of an electrochemical device an electrode may have an atomic ratio of a solid phase and a liquid phase that is at least 1%, at least 10%, at least 20%, at least 30%, at least 40%, at least 50%, at least 60%, at least 70%, at least 80%, or at least 90%. In some embodiments, the atomic ratio of the solid phase to the liquid phase in the alloy may stay within a range that is less than 100%, less than or equal to 90%, less than or equal to 80%, less than or equal to 70%, less than or equal to 60%, less than or equal to 50%, less than or equal to 40%, less than or equal to 30%, less than or equal to 20%, or less than or equal to 10%. Combinations of the above recited ranges are also possible (e.g., the atomic ratio of the solid phase to the liquid phase in the alloy may stay within a range of at least 1% and less than 100%, the atomic ratio of the solid phase to the liquid phase in the alloy may stay within a range of least 70% and less than or equal to 80%). Other ranges are also possible.

As noted above, in certain embodiments, at least a portion of the solid phase and/or at least a portion of the liquid phase of the alloy may change its state of matter as the electrochemical device is being operated. For example, in certain embodiments, the atomic ratio of the solid phase to the liquid phase may change as the electrochemical device is being charged and/or discharged, as a function of temperature, pressure, and/or the state of charge of the device. For example, in certain embodiments, the atomic ratio of the solid phase to the liquid phase may change by less than or equal to 30%, less than or equal to 20%, less than or equal to 10%, less than or equal to 8%, less than or equal to 6%, less than or equal to 4%, or less than or equal to 2% as the device is being charged and/or discharged. In some embodiments, the atomic ratio of the solid phase to the liquid phase may change by greater than or equal to 1%, greater than or equal to 2%, greater than or equal to 4%, greater than or equal to 6%, or greater than or equal to 8% as the device is being charged and/or discharged. Combinations of the above recited ranges are also possible (e.g., the atomic ratio of the solid phase to the liquid phase changes by less than or equal to 30% and greater than or equal to 1% as the device is being charged and/or discharged, the atomic ratio of the solid phase to the liquid phase changes by less than or equal to 6% and greater than or equal to 2% as the device is being charged and/or discharged). Other ranges both greater and less than those noted above are also possible.

In certain embodiments, the solid phase of an alloy (e.g., electroactive material) comprises Li, Na, and/or K. In some embodiments, the solid phase comprises at least one alkali metal, at least two alkali metals, or at least three alkali metals.

In some embodiments, the solid phase comprises Li. In some such embodiments, the solid phase may comprise Li in any of a variety of suitable amounts. In some embodiments, for example, the solid phase comprises Li in an amount greater than or equal to 1 mol. %, greater than or equal to 10 mol. %, greater than or equal to 20 mol. %, greater than or equal to 30 mol. %, greater than or equal to 40 mol. %, greater than or equal to 50 mol. %, greater than or equal to 60 mol. %, greater than or equal to 70 mol. %, greater than or equal to 80 mol. %, or greater than or equal to 90 mol. % based on the total number of moles in the solid phase. In certain embodiments, the solid phase comprises Li in an amount less than or equal to 99.9 mol. %, less than or equal to 90 mol. %, less than or equal to 80 mol. %, less than or equal to 70 mol. %, less than or equal to 60 mol. %, less than or equal to 50 mol. %, less than or equal to 40 mol. %, less than or equal to 30 mol. %, less than or equal to 20 mol. %, or less than or equal to 10 mol. % based on the total number of moles in the solid phase. Combinations of the above recited ranges are also possible (e.g., the solid phase comprises Li in an amount greater than or equal to 1 mol. % and less than or equal to 99.9 mol. % based on the total number of moles in the solid phase, the solid phase comprises Li in an amount greater than or equal to 90 mol. % and less than or equal to 99.9 mol. % based on the total number of moles in the solid phase). Other ranges of Li in the solid phase of an alloy both greater than and less than those noted above are also possible.

In certain embodiments, the solid phase comprises Na. In some such embodiments, the solid phase may comprise Na in any of a variety of suitable amounts. In some embodiments, for example, the solid phase comprises Na in an amount greater than or equal to 1 mol. %, greater than or equal to 10 mol. %, greater than or equal to 20 mol. %, greater than or equal to 30 mol. %, greater than or equal to 40 mol. %, greater than or equal to 50 mol. %, greater than or equal to 60 mol. %, greater than or equal to 70 mol. %, greater than or equal to 80 mol. %, or greater than or equal to 90 mol. % based on the total number of moles in the solid phase. In certain embodiments, the solid phase comprises Na in an amount less than or equal to 99.9 mol. %, less than or equal to 90 mol. %, less than or equal to 80 mol. %, less than or equal to 70 mol. %, less than or equal to 60 mol. %, less than or equal to 50 mol. %, less than or equal to 40 mol. %, less than or equal to 30 mol. %, less than or equal to 20 mol. %, or less than or equal to 10 mol. % based on the total number of moles in the solid phase. Combinations of the above recited ranges are also possible (e.g., the solid phase comprises Na in an amount greater than or equal to 1 mol. % and less than or equal to 99.9 mol. % based on the total number of moles in the solid phase, the solid phase comprises Na in an amount greater than or equal to 1 mol. % and less than or equal to 10 mol. % based on the total number of moles in the solid phase). Other ranges of Na in the solid phase of an alloy both greater than and less than those noted above are also possible.

In some embodiments, the solid phase comprises K. In some such embodiments, the solid phase may comprise K in any of a variety of suitable amounts. In some embodiments, for example, the solid phase comprises K in an amount greater than or equal to 1 mol. %, greater than or equal to 10 mol. %, greater than or equal to 20 mol. %, greater than or equal to 30 mol. %, greater than or equal to 40 mol. %, greater than or equal to 50 mol. %, greater than or equal to 60 mol. %, greater than or equal to 70 mol. %, greater than or equal to 80 mol. %, or greater than or equal to 90 mol. % based on the total number of moles in the solid phase. In certain embodiments, the solid phase comprises K in an amount less than or equal to 99.9 mol. %, less than or equal to 90 mol. %, less than or equal to 80 mol. %, less than or equal to 70 mol. %, less than or equal to 60 mol. %, less than or equal to 50 mol. %, less than or equal to 40 mol. %, less than or equal to 30 mol. %, less than or equal to 20 mol. %, or less than or equal to 10 mol. % based on the total number of moles in the solid phase. Combinations of the above recited ranges are also possible (e.g., the solid phase comprises K in an amount greater than or equal to 1 mol. % and less than or equal to 99.9 mol. % based on the total number of moles in the solid phase, the solid phase comprises K in an amount greater than or equal to 1 mol. % and less than or equal to 10 mol. % based on the total number of moles in the solid phase). Other ranges of K in the solid phase of an alloy both greater than and less than those noted above are also possible.

Any of the above recited ranges with respect to the amount of Li, Na, and/or K in the solid phase may be combined. In a certain non-limiting embodiment, the solid phase comprises Li and Na. For example, in some embodiments, the solid phase may comprise Li in an amount greater than or equal to 90 mol. % and Na in amount less than or equal to 10 mol. % based on the total number of moles in the solid phase. In another non-limiting embodiment, the solid phase comprises Li and K. For example, in certain embodiments, the solid phase may comprise Li an amount greater than or equal to 90 mol. % and K in an amount less than or equal to 10 mol. % based on the total number of moles in the solid phase. In yet another non-limiting embodiment, the solid phase may comprise Na and K. In some embodiments, for example, the solid phase may comprise Na in an amount of 50 mol. % and K in an amount of 50 mol. % based on the total number of moles in the solid phase. In yet another non-limiting embodiment, the solid phase may comprise Li, Na, and K. In some embodiments, for example, the solid phase may comprise Li in an amount greater than or equal to 80 mol. %, Na in amount less than or equal to 10 mol. %, and K in an amount less than or equal to 10 mol. % based on the total number of moles in the solid phase. Other combinations are also possible based on the ranges recited herein.

In certain embodiments, the liquid phase of an alloy (e.g., electroactive material) comprises Li, Na, and/or K. In some embodiments, the liquid phase comprises at least one alkali metal, at least two alkali metals, or at least three alkali metals.

In some embodiments, the liquid phase comprises Li. In some such embodiments, the liquid phase may comprise Li in any of a variety of suitable amounts. In some embodiments, for example, the liquid phase comprises Li in an amount greater than or equal to 1 mol. %, greater than or equal to 10 mol. %, greater than or equal to 20 mol. %, greater than or equal to 30 mol. %, greater than or equal to 40 mol. %, greater than or equal to 50 mol. %, greater than or equal to 60 mol. %, greater than or equal to 70 mol. %, greater than or equal to 80 mol. %, or greater than or equal to 90 mol. % based on the total number of moles in the liquid phase. In certain embodiments, the liquid phase comprises Li in an amount less than or equal to 99.9 mol. %, less than or equal to 90 mol. %, less than or equal to 80 mol. %, less than or equal to 70 mol. %, less than or equal to 60 mol. %, less than or equal to 50 mol. %, less than or equal to 40 mol. %, less than or equal to 30 mol. %, less than or equal to 20 mol. %, or less than or equal to 10 mol. % based on the total number of moles in the liquid phase. Combinations of the above recited ranges are also possible (e.g., the liquid phase comprises Li in an amount greater than or equal to 1 mol. % and less than or equal to 99.9 mol. %, the liquid phase comprises Li in an amount greater than or equal to 1 mol. % and less than or equal to 10 mol. %). Other ranges of Li in the liquid phase of an alloy both greater than and less than those noted above are also possible.

In certain embodiments, the liquid phase comprises Na. In some such embodiments, the liquid phase may comprise Na in any of a variety of suitable amounts. In some embodiments, for example, the liquid phase comprises Na in an amount greater than or equal to 1 mol. % greater than or equal to 10 mol. %, greater than or equal to 20 mol. %, greater than or equal to 30 mol. %, greater than or equal to 40 mol. %, greater than or equal to 50 mol. %, greater than or equal to 60 mol. %, greater than or equal to 70 mol. %, greater than or equal to 80 mol. %, or greater than or equal to 90 mol. % based on the total number of moles in the liquid phase. In certain embodiments, the liquid phase comprises Na in an amount less than or equal to 99.9 mol. %, less than or equal to 90 mol. %, less than or equal to 80 mol. %, less than or equal to 70 mol. %, less than or equal to 60 mol. %, less than or equal to 50 mol. %, less than or equal to 40 mol. %, less than or equal to 30 mol. %, less than or equal to 20 mol. %, or less than or equal to 10 mol. % based on the total number of moles in the liquid phase. Combinations of the above recited ranges are also possible (e.g., the liquid phase comprises Na in an amount greater than or equal to 1 mol. % and less than or equal to 99.9 mol. %, the liquid phase comprises Na in an amount greater than or equal to 90 mol. % and less than or equal to 99.9 mol. %). Other ranges of Na in the liquid phase of an alloy both greater than and less than those noted above are also possible.

In some embodiments, the liquid phase comprises K. In some such embodiments, the liquid phase may comprise K in any of a variety of suitable amounts. In some embodiments, for example, the liquid phase comprises K in an amount greater than or equal to 1 mol. % greater than or equal to 10 mol. %, greater than or equal to 20 mol. %, greater than or equal to 30 mol. %, greater than or equal to 40 mol. %, greater than or equal to 50 mol. %, greater than or equal to 60 mol. %, greater than or equal to 70 mol. %, greater than or equal to 80 mol. %, or greater than or equal to 90 mol. % based on the total number of moles in the liquid phase. In certain embodiments, the liquid phase comprises K in an amount less than or equal to 99.9 mol. %, less than or equal to 90 mol. %, less than or equal to 80 mol. %, less than or equal to 70 mol. %, less than or equal to 60 mol. %, less than or equal to 50 mol. %, less than or equal to 40 mol. %, less than or equal to 30 mol. %, less than or equal to 20 mol. %, or less than or equal to 10 mol. % based on the total number of moles in the liquid phase. Combinations of the above recited ranges are also possible (e.g., the liquid phase comprises K in an amount greater than or equal to 1 mol. % and less than or equal to 99.9 mol. %, the liquid phase comprises K in an amount greater than or equal to 90 mol. % and less than or equal to 99.9 mol. %). Other ranges of K in the liquid phase of an alloy both greater than and less than those noted above are also possible.

Any of the above recited ranges with respect to the amount of Li, Na, and/or K in the liquid phase may be combined. In a certain non-limiting embodiment, the liquid phase comprises Na and Li. In some embodiments, for example, the liquid phase may comprise Na in an amount greater than or equal to 90 mol. % and Li in an amount less than or equal to 10 mol. % based on the total number of moles in the liquid phase. In another non-limiting embodiment, the liquid phase comprises K and Li. For example, in certain embodiments, the liquid phase may comprise K in an amount greater than or equal to 90 mol. % and Li in an amount less than or equal to 10 mol. % based on the total number of moles in the liquid phase. In yet another non-limiting embodiments, the liquid phase comprises Na and K. For example, in certain embodiments, the liquid phase may comprise Na in amount of 50 mol. % and K in an amount of 50 mol. % based on the total number of moles in the liquid phase. As another example, in some embodiments, the liquid phase may comprise Na in amount greater than or equal to 10 mol. % and less than or equal to 60% (e.g., 23 mol. %) and K in an amount greater than or equal to 40 mol. % and less than or equal to 90 mol. % (e.g., 77 mol. %) based on the total number of moles in the liquid phase. In yet another non-limiting embodiment, the liquid phase comprises Na, K, and Li. For example, in certain embodiments, the liquid phase may comprise Na an amount greater than or equal to 40 mol. %, K in amount less than or equal to 40 mol. %, and Li in an amount less than or equal to 10 mol. % based on the total number of moles in the liquid phase. Other combinations are also possible based on the ranges recited herein.

The above ranges of compositions for solid and liquid phases may be combined. In one such embodiment, the solid phase may comprise Li and the liquid phase may comprise at least one of Na and K. For example, the solid phase may comprise Li in an amount greater than or equal to 90 mol. % or any other appropriate percentage based on the total number of moles in the solid phase. Correspondingly, the liquid phase may comprise Na and/or K in an amount greater than or equal to 40 mol. %, 60 mol. %, 80 mol. %, 90 mol. %, and/or any other appropriate percentage based on the total number of moles in the liquid phase.

In some embodiments, both the solid phase and the liquid phase of the alloy comprise Li. In some embodiments, the solid phase may comprise a greater mol. % of Li than the liquid phase, based on the total number of moles in the alloy. For example, in some embodiments, the solid phase comprises greater than 50 mol. % Li (e.g., 60 mol. % Li, 70 mol. % Li, 80 mol. % Li, 90 mol. % Li) and the liquid phase comprises less than 50 mol. % Li (e.g., 40 mol. % Li, 30 mol. % Li, 20 mol. % Li, 10 mol. % Li) based on the total number of moles in the alloy. In some such embodiments wherein both the solid phase and the liquid phase of the alloy comprise Li, either the solid phase or the liquid phase may also comprise Na and/or K.

In some embodiments, both the solid phase and the liquid phase of the alloy comprise Na. In some embodiments, the solid phase comprises a greater mol. % of Na than the liquid phase, based on the total number of moles in the alloy. For example, in some embodiments, the solid phase comprises greater than 50 mol. % Na (e.g., 60 mol. % Na, 70 mol. % Na, 80 mol. % Na, 90 mol. % Na) and the liquid phase comprises less than 50 mol. % Na (e.g., 40 mol. % Na, 30 mol. % Na, 20 mol. % Na, 10 mol. % Na) based on the total number of moles in the alloy. In some such embodiments wherein both the solid phase and the liquid phase of the alloy comprise Na, either the solid phase or the liquid phase may also comprise Li and/or K.

In some embodiments, both the solid phase and the liquid phase of the alloy comprise K. In some embodiments, the solid phase comprises a greater mol. % of K than the liquid phase, based on the total number of moles in the alloy. For example, in some embodiments, the solid phase comprises greater than 50 mol. % K (e.g., 60 mol. % K, 70 mol. % K, 80 mol. % K, 90 mol. % K) and the liquid phase comprises less than 50 mol. % K (e.g., 40 mol. % K, 30 mol. % K, 20 mol. % K, 10 mol. % K) based on the total number of moles in the alloy. In some such embodiments wherein both the solid phase and the liquid phase of the alloy comprise K, either the solid phase or the liquid phase may also comprise Li and/or Na.

In certain non-limiting embodiments, the solid phase comprises 80 mol. % Li based on the total number of moles in the alloy, and the liquid phase comprises 15.4 mol. % K and 4.6 mol. % Na based on the total number of moles in the alloy.

For the sake of clarity, an alloy comprising only a single solid phase and a single liquid phase is discussed. However, due to the complex interactions of a multicomponent alloy, it should be understood that some electrochemical materials including the alloys described herein may include multiple solid and/or liquid phases that coexist with one another during operation. Accordingly, the disclosure should not be interpreted as being limited to systems that include a single solid phase and a single liquid phase.

As would be understood by a person of ordinary skill in the art, the state of matter of a material depends on the environment of the material, such as the temperature and/or pressure of the material. Accordingly, the alloys described herein may include a solid phase and a liquid phase at any desired combination of operating temperatures and/or pressures. In some embodiments, it may be desirable for an electrochemical device to include a liquid phase at ambient conditions. For example, it may be beneficial for the alloy to comprise the solid phase and the liquid phase at or near room temperature in order to store and/or utilize the electrode in a variety of applications without controlling a temperature of an electrochemical device. In certain embodiments, an alloy may comprise a solid phase and a liquid phase at a temperature of at least 15° C., at least 20° C., or at least 25° C. In some embodiments, the alloy may also include the solid phase and the liquid phase at a temperature of less than or equal to 30° C., less than or equal to 25° C., or less than or equal to 20° C. Combinations of the above recited ranges are also possible (e.g., the alloy comprises the solid phase and the liquid phase at a temperature between 15° C. and 30° C., the alloy comprises the solid phase and the liquid phase at a temperature between 20° C. and 25° C.). However, depending on the desired application and particular compositions used, operating temperatures where both solid and liquid phases of an alloy are present both greater than and less than those noted above are also contemplated.

In certain embodiments, the solid phases of the electrodes described herein may have any of a variety of yield stresses. As explained herein, it may be advantageous, in some embodiments, to employ an electrode with a relatively low yield stress, which may be capable of providing both high energy densities and current densities. According to some embodiments, the yield stress of the alkali metal (e.g., Li) may decrease when alloyed with an additional element (e.g., Na and/or K). In certain embodiments, the yield stress of a solid phase of an electrode is less than or equal to 0.5 MPa, less than or equal to 0.4 MPa, less than or equal to 0.3 MPa, less than or equal to 0.2 MPa, less than or equal to 0.1 MPa, less than or equal to 0.05 MPa, less than or equal to 0.01 MPa, or less than or equal to 0.005 MPa. In certain embodiments, the yield stress of the solid phase is greater than or equal to 0.001 MPa, greater than or equal to 0.005 MPa, greater than or equal to 0.01 MPa, greater than or equal to 0.05 MPa, greater than or equal to 0.1 MPa, greater than or equal to 0.2 MPa, greater than or equal to 0.3 MPa, or greater than or equal to 0.4 MPa. Combination of the above-recited ranges are also possible (e.g., the electrode solid phase has a yield stress of less than or equal to 0.5 MPa and greater than or equal to 0.001 MPa, the electrode solid phase has a yield stress of less than or equal to 0.2 MPa and greater than or equal to 0.1 MPa). Other ranges are also possible. The yield stress of a solid phase material may be measured in any appropriate manner including a typical tensile specimen test using either an identified yield point and/or an offset yield point of 0.2%.

The electroactive materials described herein may be used as an electrode material in an electrochemical device (e.g., battery) that is capable of charging/discharging with high areal capacity. For example, in certain embodiments, the electroactive materials may be used in an electrochemical device that is capable of charging/discharging with an areal capacity greater than or equal to 2 $mAh/cm^2$, greater than or equal to 3 $mAh/cm^2$, greater than or equal to 4 $mAh/cm^2$, greater than or equal to 5 $mAh/cm^2$ greater than or equal to 6 $mAh/cm^2$, greater than or equal to 7 $mAh/cm^2$, or greater than or equal to 8 $mAh/cm^2$.

The electroactive materials described herein may be used as an electrode material in an electrochemical device (e.g., battery) that is capable of charging/discharging with high current densities. For example, in certain embodiments, the electroactive material may be used in an electrochemical device that is capable of charging/discharging with a current density greater than or equal to 1 $mA/cm^2$, greater than or equal to 2 $mA/cm^2$, greater than or equal to 3 $mA/cm^2$, greater than or equal to 4 $mA/cm^2$, greater than or equal to 5 $mA/cm^2$, greater than or equal to 6 $mA/cm^2$, greater than or equal to 7 $mA/cm^2$, greater than or equal to 8 $mA/cm^2$, greater than or equal to 9 $mA/cm^2$, or greater than or equal to 10 $mA/cm^2$.

In certain embodiments, the above recited areal capacities and/or current densities may be achieved without dendrite-induced short circuits. Such devices may advantageously provide high areal capacities and/or energy densities over a large number of cycles (e.g., greater than 500 cycles, greater than 1000 cycles, greater than 1500 cycles, etc.).

The alloy based electroactive materials, and the corresponding electrodes they may be formed into, described herein may be fabricated using techniques known to a person of ordinary skill in the art, for example, melting, casting, spreading, doctor-blading, spray deposition, evaporation, sputtering, chemical vapor deposition (CVD), mechanical mixing of the components as solids and/or liquids, ball milling, mechanical pressing, sintering of mixed particulates, and/or any other appropriate method.

In some embodiments, the electroactive alloys described herein may be used as an electrode (e.g., cathode or anode) in an electrochemical device such as a battery, a capacitor, a supercapacitor, or other appropriate electrochemical device. According to some such embodiments, the electrochemical device may be a battery, such as a rechargeable battery (e.g., secondary battery) or a non-rechargeable battery (e.g., primary battery). In some embodiments, the battery (e.g., rechargeable battery) may be used in transportation (e.g., electric vehicles, electric aircrafts, electric watercrafts, space vehicles), consumer products, grid-storage applications (e.g., electrical power grids for the storage of renewable energy), and/or any other appropriate application.

In some embodiments, an anode of a device comprises an electroactive material as described herein (e.g., an alloy having a solid phase and a liquid phase). The cathode may comprise any of a variety of electroactive materials (e.g., cathode active materials). In certain embodiments, the cathode is or comprises a cathode active material of a lithium-ion battery, sodium-ion battery, or potassium-ion battery. In some embodiments, the cathode active material comprises one or more metal oxides. In some embodiments, an intercalation cathode (e.g., a lithium-intercalation cathode) may be used. Non-limiting examples of suitable materials that may intercalate ions of an electroactive material (e.g., alkaline metal ions) include metal oxides, metal sulfides, metal halides, and/or redox-active organic compounds. In some embodiments, the cathode is an intercalation cathode comprising a lithium transition metal oxide or a lithium transition metal phosphate. In some embodiments, the cathode comprises lithium nickel manganese cobalt oxide or lithium iron phosphate. In such an embodiment, the cathode, or other electrode of the electrochemical device, may include one or more additives, electrolytes, salts, and/or binder materials (e.g., polymers).

According to certain embodiments, the electrochemical devices described herein may include a solid electrolyte disposed between a first electrode including a solid and liquid phase as described herein and a second electrode located on an opposing side of the solid electrolyte. In some embodiments, the solid electrolyte may comprise an inorganic compound, such as a ceramic and/or crystalline material. For example, in certain embodiments, the solid electrolyte comprise a lithium garnet, such as a lithium lanthanum titanium oxide (LLiTO). In certain embodiments, the solid electrolyte comprises Li-β"-$Al_2O_3$ (LBA), Na-β"-$Al_2O_3$(NBA), or K-β"-$Al_2O_3$ (KBA). In certain embodiments, the solid electrolyte comprises a superionic conductor (SICON), such as LiSICON and/or NaSICON. The solid electrolyte may comprise a lithium solid electrolyte, such as lithium phosphorus sulfide, or a potassium solid electrolyte, in certain embodiments. In some embodiments, one or more solid polymers can be used to form a solid electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing. In certain embodiments, combinations of the above recited inorganic compounds and/or polymers may be used as the solid electrolyte, such as a hybrid or composite solid electrolyte comprising an inorganic compound and a polymer. In certain embodiments, the inorganic compound and/or polymer are conductors of the working ion of the electrochemical device (e.g., Li). Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

According to some embodiments, an electrochemical device (e.g., a battery) is described, wherein the electrochemical device comprises at least one electrode. In some embodiments, the electrochemical device comprises two electrodes, such as a cathode and an anode. A person of ordinary skill in the art would be familiar with the term "cathode", which refers to the positive electrode, and the term "anode" which refers to the negative electrode during normal usage of the device as a power source (i.e. during discharge). FIG. 1 shows, according to certain embodiments, a cross-sectional schematic diagram of an electrochemical device. As shown in FIG. 1, an electrochemical device 100 comprises a first electrode 102, a solid electrolyte 104 disposed on the first electrode, and a second electrode 106 disposed on the solid electrolyte on a side opposite the first electrode. The first and second electrodes of the electrochemical device may include corresponding first and second electroactive materials. For instance, the first and/or second electroactive materials may include an alloy with a solid and liquid phase during nominal operation, as described herein.

While a single planar geometry of the electrodes has been depicted in the figures with the electrodes located on opposing sides of a solid electrolyte, other configurations are also possible. For instance, jelly rolls, planar stacks of electrodes, and any other appropriate electrode configuration may also be used. Additionally, other appropriate components not depicted in the figures such as current collectors (wire, foil, grid, etc.) that are in electrical contact with the electrodes may also be included in an electrochemical device as the depicted embodiment is schematic in nature. Additionally, while a solid electrolyte has been depicted, any appropriate component capable of separating the two electrodes from one another, including appropriately constructed separators, may also be used as the disclosure is not limited in this fashion.

The one or more electrodes of the electrochemical devices described herein may have any of a variety of suitable thicknesses. Referring to FIG. 1, for example, electrode 102 may have a thickness 108. In some embodiments, one or more electrodes of the electrochemical device has a thickness of less than or equal to 1 millimeter, less than or equal to 500 micrometers, less than or equal to 400 micrometers, less than or equal to 300 micrometers, less than or equal to 200 micrometers, less than or equal to 100 micrometers, less than or equal to 50 micrometers, less than or equal to 25 micrometers, or less than or equal to 10 micrometers. In certain embodiments, the electrode has a thickness of at least 1 micrometer, at least 10 micrometers, at least 25 micrometers, at least 50 micrometers, at least 100 micrometers, at least 200 micrometers, at least 300 micrometers, or at least 400 micrometers. Combinations of the above-referenced ranges are also possible (e.g., one or more electrodes may have a thickness between at least 1 micrometer and less than or equal to 1 millimeter, one or more electrodes may has a thickness between at least 10 micrometers and less than or equal to 50 micrometers). Other ranges are also possible.

Figure 2:
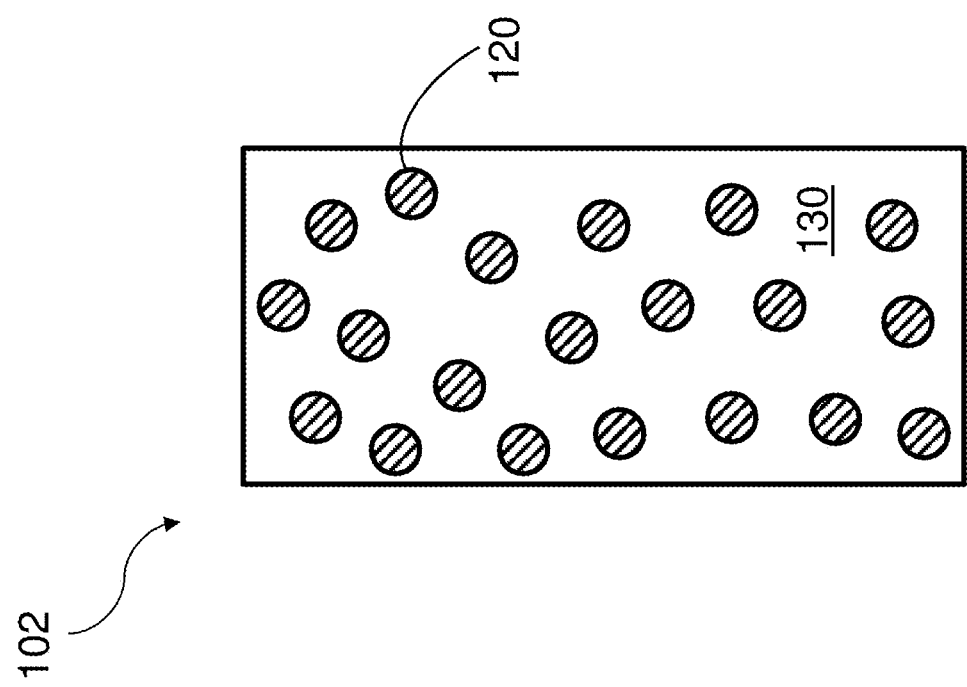
FIG. 2 shows, according to certain embodiments, a cross-sectional schematic diagram of an electrode comprising a solid phase dispersed in a liquid phase.

The liquid phase and the solid phase in the alloy may co-exist with one another in any of a variety of configurations. In some embodiments, an electrode 102 may include multiple particles of a solid phase 120 disposed in, or otherwise dispersed (e.g., randomly dispersed), within a liquid phase 130, see FIG. 2. In certain embodiments, depending on the particular atomic ratio of solid phase to liquid phase, solid phase 120 and/or liquid phase 130 may form an interconnected network. In some embodiments, the alloy may form a solid-liquid mixture, a slurry, or an amalgam with any appropriate combination of resulting physical and electrochemical properties. In certain embodiments, the liquid phase and/or the solid phase may form an interconnected network.

Figure 3:
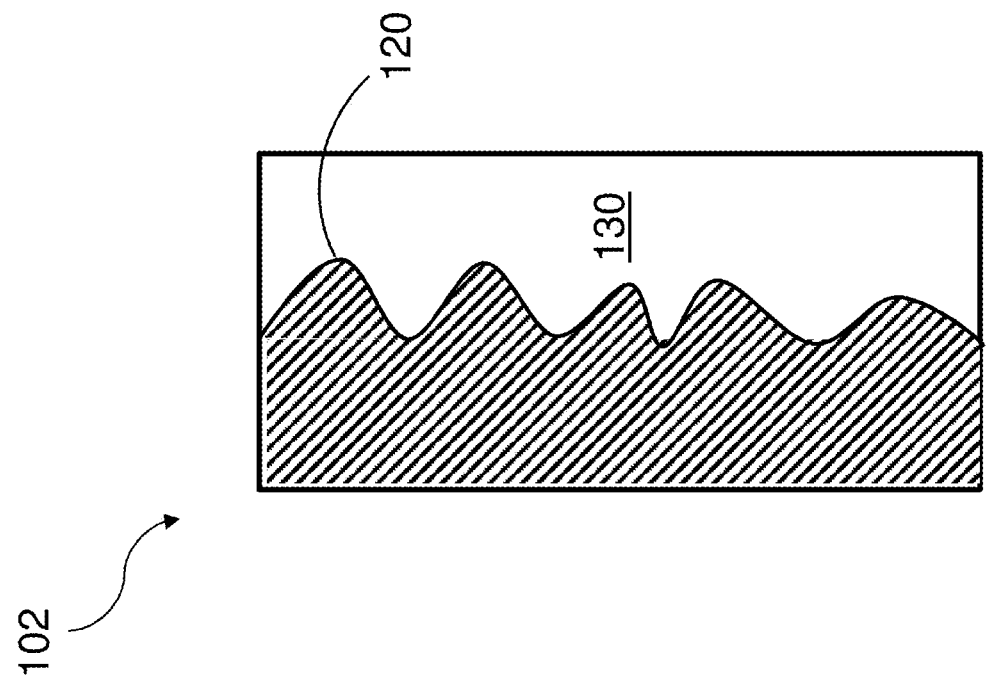
FIG. 3 shows, according to certain embodiments, a cross-sectional schematic diagram of an electrode comprising a separate solid and liquid phase in contact with one another along an interface.

In another embodiment, as depicted in FIG. 3, an electrode 102 comprises a solid phase 120 that is separate from a liquid phase 130 with an interface extending between the two phases. In such an embodiment, the solid or liquid phase may be first deposited onto a current collector or other substrate, not depicted. While these configurations are shown in the figures, it should be understood that other configurations of other electrodes with a solid phase and a liquid phase may exist, in some embodiments.

Figure 4:
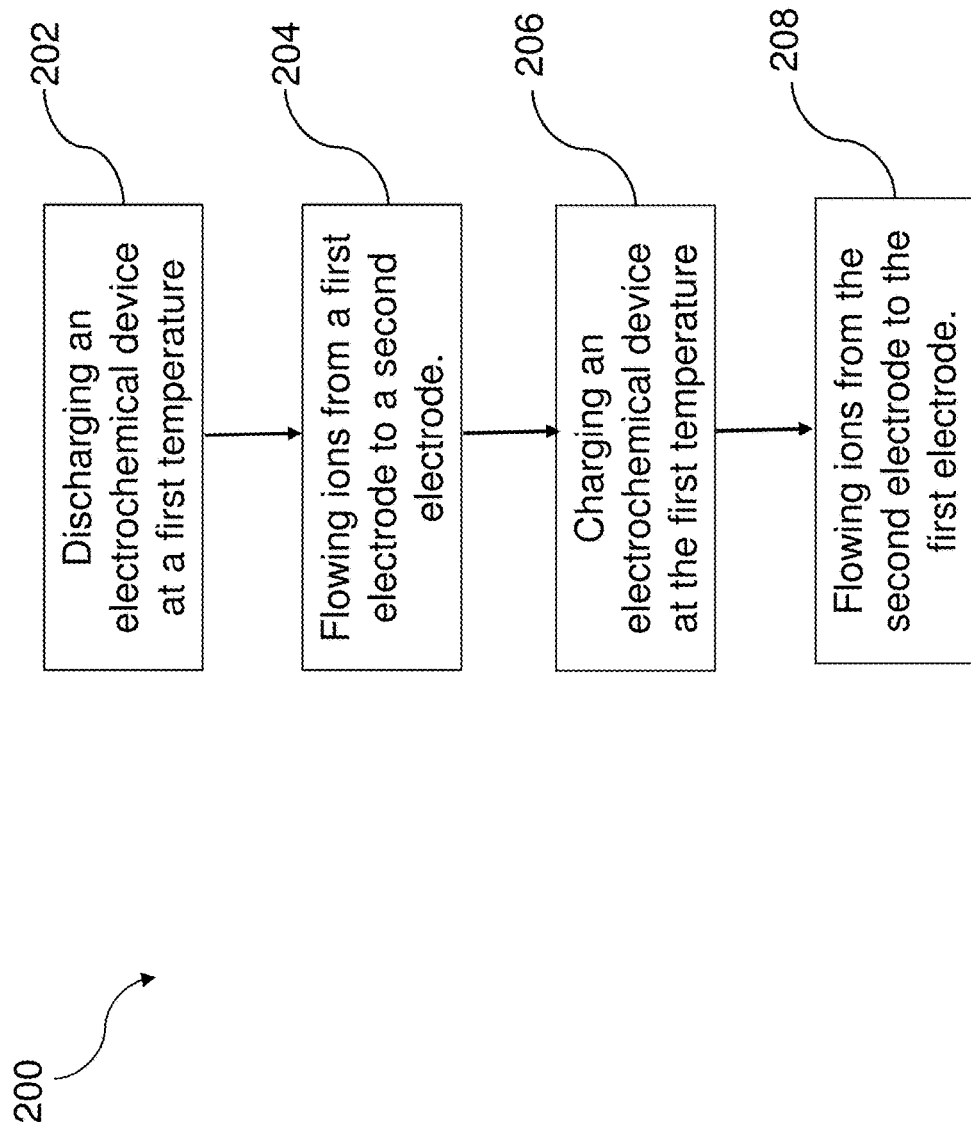
FIG. 4 shows, according to certain embodiments, a method of operating an electrochemical device.

According to some embodiments, a method of operating an electrochemical device is described. FIG. 4 shows, according to certain embodiments, a method of operating an electrochemical device. In certain embodiments, method 200 comprises discharging an electrochemical device at a first temperature at step 202. In some such embodiments, at least one electrode of the electrochemical device comprises an alloy with a solid phase and a liquid phase at the first temperature, as described herein.

The temperature (e.g., first temperature) at which the electrochemical device is discharged may be any of a variety of temperatures. As described above, in certain embodiments, it may be desirable to discharge the electrochemical device at or near room temperature, depending on the application of the device. In some embodiments, for example, the temperature at which the electrochemical device is discharged is at least 15° C., at least 20° C., or at least 25° C. In some embodiments, the temperature at which the electrochemical device is discharged less than or equal to 30° C., less than or equal to 25° C., or less than or equal to 20° C. Combinations of the above recited ranges are also possible (e.g., the temperature at which the electrochemical device is discharged is between 15° C. and 30° C., the temperature at which the electrochemical device is discharged is between 20° C. and 25° C.). Other temperature ranges both greater than and less than those described above where an alloy includes both a solid and liquid phase during operation are also possible.

In some embodiments, as a result of discharging the electrochemical cell, ions (e.g., Li ions) may flow from the electroactive material of a first electrode (e.g., anode), through an electrolyte (e.g., solid electrolyte), and to a second electrode (e.g., cathode), as would be understood by a person of ordinary skill in the art. For example, referring to FIG. 4, method 200 may further comprise flowing ions from a first electrode to a second electrode at step 204. In certain embodiments, for example, an electrode of an electrochemical device containing an alloy having a solid phase and a liquid phase may be discharged, such that ions flow through at least a portion of the solid phase and/or the liquid phase of the alloy. Advantageously, as a result of the combination of the solid phase and the liquid phase in the alloy, the ions (e.g., Li ions) may have a higher flux and/or mobility in the alloy, resulting in higher critical current densities for the electrochemical device, as described. Without wishing to be bound by theory, depending on the configuration of the electrode (see, for example FIGS. 2 and 3) embodiments are contemplated wherein the ions of the electroactive material flow through both the solid phase and the liquid phase of the alloy, only the solid phase of the alloy, only the liquid phase of the alloy, or combinations thereof.

Furthermore, as described herein, as a result of operating (e.g., discharging) the electrochemical device and flowing ions from a first electrode (e.g., anode) to a second electrode (e.g., cathode), the relative amounts of the solid phase and liquid phase of the alloy may change, depending on the composition of the alloy. For example, removing electroactive ions from an alloy electrode may change the overall composition of the alloy which will cause a corresponding change in the proportion of solid and liquid phase of the alloy.

According to certain embodiments, method 200 may comprise charging the electrochemical device at step 206. For example, referring to FIG. 4, method 200 may comprise charging the electrochemical device at the first temperature at step 206. As stated above, the temperature at which the electrochemical device is charged may be at or near room temperature (e.g., between 15° C. and 30° C.), though other temperatures are contemplated. In some embodiments, as a result of charging the electrochemical cell, ions may flow from the second electrode, through the electrolyte, and to the first electrode. Referring to FIG. 4, for example, method 200 may comprise flowing ions from the second electrode to the first electrode at step 208. Due to the flow of ions back into the first electrode, a composition of the alloy including a solid and liquid phase forming the electrode may again change as additional electroactive ions are added back into the alloy. This may cause the change in the relative proportions of the solid and liquid phase to revert towards an initial atomic ratio at a full state of charge of the electrochemical device. Thus, charging and discharging of the electrochemical device may correspond to changes in the relative proportions of the solid and liquid phases present within an alloy forming an electrode of the device.

In some embodiments, discharging an electrochemical device (e.g., as in step 202) and charging an electrochemical device (e.g., as in step 208) may constitute cycling the electrochemical device. In certain embodiments, method 200 may be repeated (e.g., the electrochemical device may be cycled) 500 times, 1,000 times, 5,000 times, 10,000 times, etc.

While FIG. 4 as explained herein describes discharging the electrochemical device followed by charging the device, a person of ordinary skill in the art would understand that embodiments may be envisioned wherein the electrochemical device may first be charged and then discharged. Alternatively, in some embodiments, an electrochemical device, such as a primary battery, is also described, and a method of operating such a device may comprise only discharging the device.

Example 1

The following example describes electroactive materials with a solid phase and a liquid phase for use in an electrochemical device.

In a first embodiment, a semi-solid electrode that incorporates a liquid metal phase in equilibrium with a solid phase is described. For example, mixtures of Na and K, which readily alloy at room temperature to produce a biphasic (liquid-solid) system (see, for example, FIG. 5C), allow further tuning of the mechanical properties of a metal electrode by adjusting the amount of liquid in equilibrium at room temperature are described. Consequently, increasing the amount of liquid present may reduce the deformation resistance of the electroactive metal and increase the critical current density.

In a second embodiment, an energy-dense solid electrode with a small amount of interfacial metallic liquid is described. For example, a Li-rich anode with a small amount of liquid Na—K alloy, which is expected to exhibit a small degree of solubility for Li, based on the binary Li—Na and Li—K phase diagrams (see, for example, FIGS. 5A and 5B, respectively) placed at the interface between Li and electrolyte. Both the high energy density of lithium and the softness of sodium and potassium may be exploited as such a cell may be both energy dense and exhibit a reduced likelihood towards short circuits as the liquid Na—K layer alleviates significant stress accumulation at the Li-electrolyte interface by transporting Li away from the electrolyte surface. The introduction of Na and K on the Li-rich alloy should not excessively impede diffusion of the lithium working ion. That is, lithium may be appreciably soluble in the Na—K composition that is used. In addition, the introduction of Na—K should facilitate the formation of a mechanically soft and deformable interface between the Li metal and the solid-state electrolyte, which may use sodium or potassium to preferentially wet the electrolyte rather than lithium.

Several symmetric cell systems were studied under galvanostatic conditions. See, for example, Table 1. Three unique solid electrolytes of similar microstructure, surface finish, hardness, fracture toughness, and ionic conductivity were utilized as ionic conductors of Li, Na, and K ($Li_{6.6}La_3Zr_{1.6}Ta_{0.4}O_{12}$ (LLZTO), Na-$\beta''$-$Al_2O_3$(NBA), K-$\beta''$-$Al_2O_3$ (KBA)) to isolate the role that the mechanical properties of the electroactive metal play on the critical current density. The ionic conductivity of $Li_{6.6}La_3Zr_{1.6}Ta_{0.4}O_{12}$ (LLZTO), Na-$\beta''$-$Al_2O_3$ (NBA), K-$\beta''$-$Al_2O_3$ (KBA)) were measured to be 1.03±0.2 mS/cm, 1.72±0.56 mS/cm and 1.07±0.3 mS/cm, respectively, via EIS. The fracture toughness of $Li_{6.6}La_3Zr_{1.6}Ta_{0.4}O_{12}$, Na-$\beta''$-$Al_2O_3$, and K-$\beta''$-$Al_2O_3$ were measured to be 2.51±0.64 MPa·m$^{0.5}$, 2.93±0.70 MPa·m$^{0.5}$ and 3.06±0.90 MPa·m$^{0.5}$ via Vickers micro indentation testing.

TABLE 1

| Cell Class | Description | No. of Samples | Mean CCD (mA/cm$^2$) | CCD Std Dev (mA/cm$^2$) | Average Area Correction Factor | Correction Std Dev |
|---|---|---|---|---|---|---|
| 1 | Li/LLZTO/Li | 8 | 0.5016 | 0.2946 | 0.975 | 0.1916 |
| 2 | Na/NBA/Na | 4 | 2.1525 | 0.7998 | 1.559 | 0.0622 |
| 3 | K/KBA/K | 3 | 2.5267 | 0.7453 | 2.192 | 0.2359 |

TABLE 1-continued

| Cell Class | Description | No. of Samples | Mean CCD (mA/cm$^2$) | CCD Std Dev (mA/cm$^2$) | Average Area Correction Factor | Correction Std Dev |
|---|---|---|---|---|---|---|
| 4 | 95K5Na/KBA/ 95K5Na | 4 | 5.6225 | 2.6287 | 2.262 | 0.5040 |
| 5 | 90K10Na/KBA/ 90K10Na | 3 | 14.90 | 5.39 | 1.727 | 0.1488 |
| 6 | NaK(e)-Li/LLZTO/ NaK(e)-Li | 17 | 1.2096 | 0.4629 | 0.9515 | 0.1162 |

Table 1 summarizes the evaluation and comparison of the symmetric cell testing detailed below. 95K5Na and 90K10Na denote binary alloy electrodes of 95 and 90 mol % K, respectively, while NaK(e)-Li denotes a Li electrode with a thin coating (~5 μm) of Na—K alloy at the eutectic composition (68 mol % K, 32 mol % Na). CCD denotes critical current density. "Average area correction factor" denotes the ratio between the initially assumed electrode area and the true contact area between the electrode and solid electrolyte as determined by post mortem image analysis.

An alkali metal flux (Li, Na, and K) was created from a metal counter-electrode (CE) through a highly polished (1 micrometer grit) polycrystalline solid electrolyte ($Li_{6.6}La_3Zr_{1.6}Ta_{0.4}O_{12}$ (LLZTO), Na-β"-$Al_2O_3$ (NBA), K-β"-$Al_2O_3$ (KBA)) to a metal working electrode where the alkali metal electrodeposits. Galvanostatic experiments were conducted to measure the critical current density under a fixed areal capacity of 3, 1.5 and 0.25 mAh·cm$^{-2}$ based on the initial assumed electrode area (which unavoidably evolves dynamically during plating and stripping). The upper limit of 3 mAh/cm$^2$ for the areal capacity was chosen assuming that a practical metallic anode battery will use a similar electrode areal capacity. Complementary areal capacities of 1.5 and 0.25 mAh/cm$^2$ were chosen to investigate whether the critical current density depends on the volume of metal stripped/plated, and to compare our measurements to similar reports in the literature. The minimum current density applied was 0.25 mA·cm$^{-2}$ corresponding to a charging rate of ~1/12C for a 3 mAh/cm$^2$ cell. In contrast, a practical battery will may be charged at rates of at least 1 C-2 C. These tests produced cell voltages of <1000 mV, which are sufficient to propagate even nm-scale surface flaws (an applied driving force of 1V is equilibrated by 7.5 GPa of compressive stress at the site of electrodeposition).

Two distinct modes of cell failure were identified in the assembled cells. The first mode, short circuit at a critical current density was identified in the majority (39/42) of cells tested. The second mode, delamination of the working electrode (leading to an excessive cell impedance, prematurely ending the experiment) was far less common and was observed primarily in pure Li/LLZTO/Li symmetric cells (Class 1) under low pressure or high areal capacity (<1.5 mAh/cm$^2$). The critical current density measurements corresponding to the first mode of failure are summarized in FIGS. 9A-9D and Table 1. Each class of electrochemical cell exhibited a unique range of critical current densities. The primary parameter varied between each cell was the deformation resistance of the electrodeposited metal, quantified by the yield stress in the case of the all-solid approach, or the liquid fraction in the semi-solid electrode approach.

When comparing the performance of cells incorporating all-solid electrodes, it was observed that as the yield stress decreases (Li—Na—K), the average critical current density increases from 0.50 mA/cm$^2$ (Li) to 2.52 mA/cm$^2$ (K) (see, for example, Table 1). This increase in critical current density can be attributed to the comparative ease of extrusion of a lower yield stress metal, thus relieving stress build up inside a surface flaw.

Regarding the semi-solid electrode approach (Classes 4 and 5), it was observed that as the K electrode is alloyed with increasing amounts of Na metal from 5 mol. % to 10 mol. %, increasing the amount of binary Na—K liquid in equilibrium with the solid alloy at room temperature from roughly 25% to 75%, the critical current is observed to again increase on average from 5.2 mA/cm$^2$ (95K-5Na) to 14.2 mA/cm$^2$ (90K-10Na) at true areal capacities on the order of 1.5 mAh/cm$^2$ (accounting for the increase in electrode-electrolyte contact area post-cycling). To place these figures in context, state of the art solid state lithium symmetric cells exhibit critical current densities of ~1 mA/cm$^2$ at an areal capacity of 0.25 mAh/cm$^2$, corresponding to a >10× improvement in critical current density and >5× improvement in areal capacity for this particular embodiment of the invention.

In another approach, in which a small amount (<50 micrometer thickness) of eutectic Na—K alloy was introduced to the interface between Li metal and LLZTO electrolyte was shown to increase the critical current on average from 0.50 mA/cm$^2$ (Li) to 1.21 mA/cm$^2$ (Li—NaK). Of interest is the observation that this "self-healing" approach (Class 6) exhibited a higher critical current density independent of applied pressure over all areal capacities considered (from 0.25 mAh/cm$^2$ to 3.5 mAh/cm$^2$ based on true electrode area) in comparison to the conventional all solid Li (Class 1). The scarcity of data points for Class 1 cells around the 3 mAh/cm$^2$ areal capacity region is due to the development of excessive cell impedance during extended stripping and plating (>1.5 mAh/cm$^2$) which prematurely ends the experiment, preventing access to higher areal capacities for the cells as constructed. Such observations are consistent with a delamination mechanism that occurs concurrently to the formation of "voids" at the electrode-electrolyte interface, which is the second failure mode identified above. The results show that the "self-healing" approach bypasses this constraint, presumably due to the liquid Na—K phase naturally "filling out" any voids that may form, whilst providing solubility to the working Li ions, thereby "self-healing" the interface.

In considering the results from the all-solid electrodes, the increase in critical current density for Na and K cells relative to Li cells may be due to differing reaction products at the electrode-electrolyte interface which promote interfacial stability. However, when considering the results from the semi-solid electrode approach using K-rich Na—K alloys of small compositional variation on KBA electrolytes, any chemical reaction products at the electrode-electrolyte interface between these cells (Class 4 vs. Class 5) should not exhibit significant variation. Nevertheless, an increase in the critical current density is observed when increasing the amount of liquid phase present by increasing the degree of Na alloying. Without being bound by any particular scientific interpretation, this result supports the hypothesis that interfacial stability, i.e. mitigation of dendrites, is improved when the interfacial electrode material is better able to mechanically yield.

A representative galvanostatic experiment conducted on a NaK(e)-Li/LLZTO/NaK(e)-Li cell (Class 6) is shown in FIGS. 10A-10D. Upon assembly, cells exhibited EIS spectra with both a resistive and capacitive component. The high frequency resistive impedance (~100Ω) corresponded to the expected resistance of a solid electrolyte disc (thickness 1 mm) with a conductivity as measured (1-2 mS/cm$^2$), while the presence of a capacitive impedance indicated the presence of an interfacial transport barrier. These observations showed that the cell has not yet undergone a short circuit, which should be indicated by a purely resistive impedance with a lower magnitude.

Figure 10A:
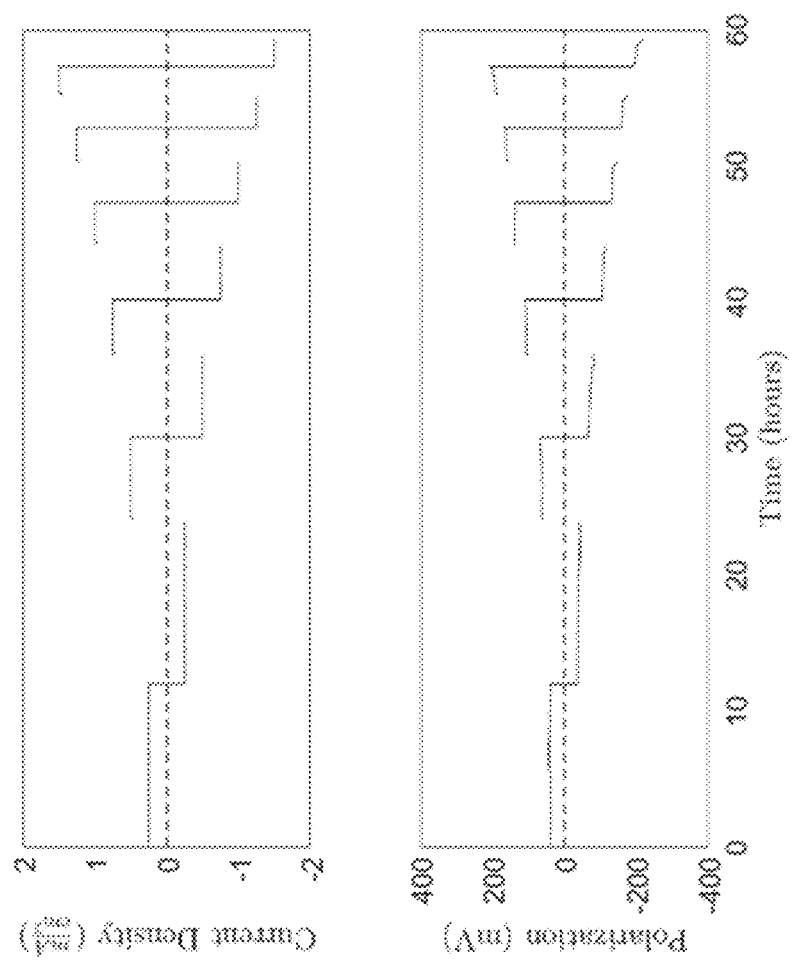
FIG. 10A shows, according to certain embodiments, the voltage time trace and current density time trace for 60 hours for a NaK(e)-Li/LLZTO/NaK(e)-Li cell.
Figure 10B:
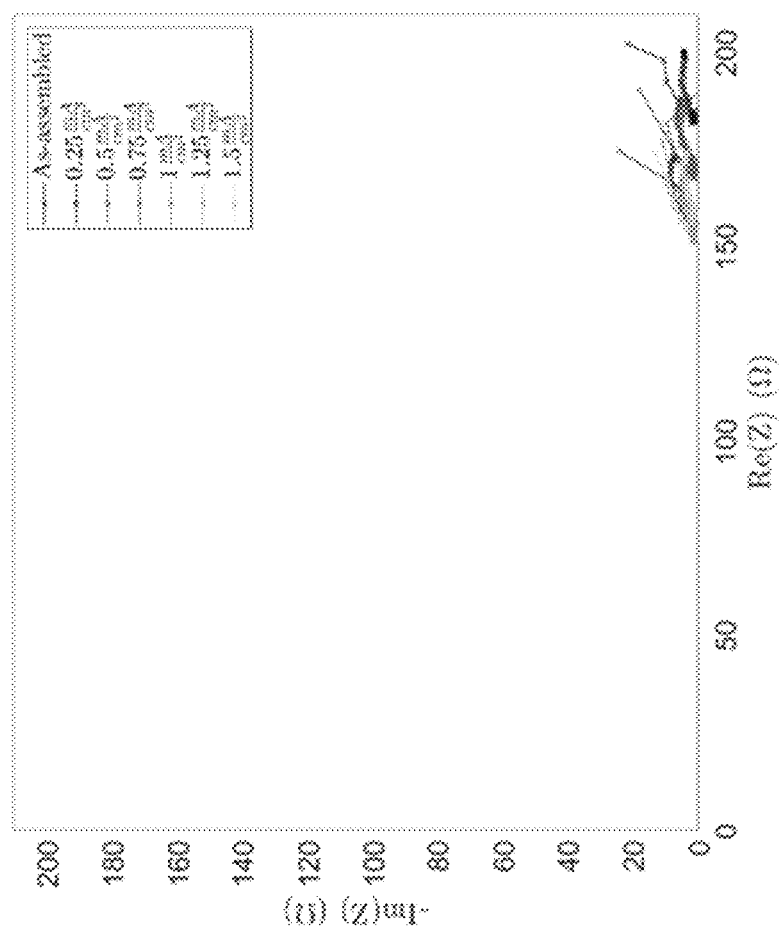
FIG. 10B shows, according to certain embodiments, an electrochemical impedance spectroscpy (EIS) spectrum for a NaK(e)-Li/LLZTO/NaK(e)-Li cell at 0.25-1.75 mA·cm$^{-2}$.
Figure 10C:
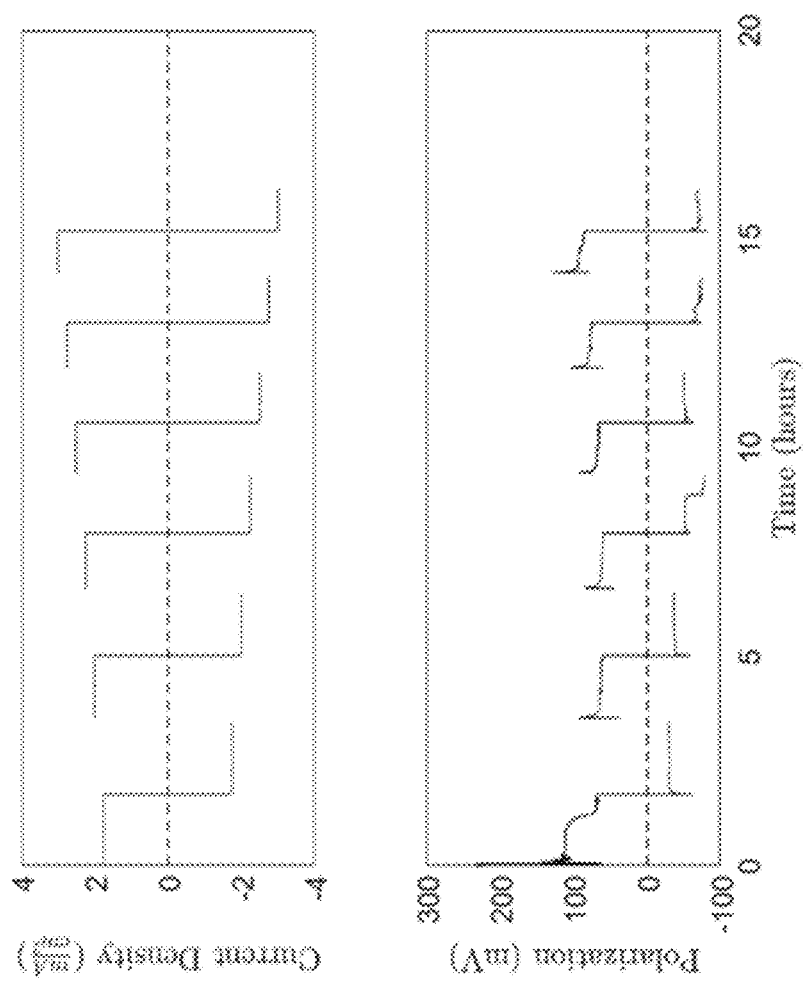
FIG. 10C shows, according to certain embodiments, the voltage time trace and current density time trace for the 20 hours following the data in FIG. 10A for a NaK(e)-Li/LLZTO/NaK(e)-Li cell.
Figure 10D:
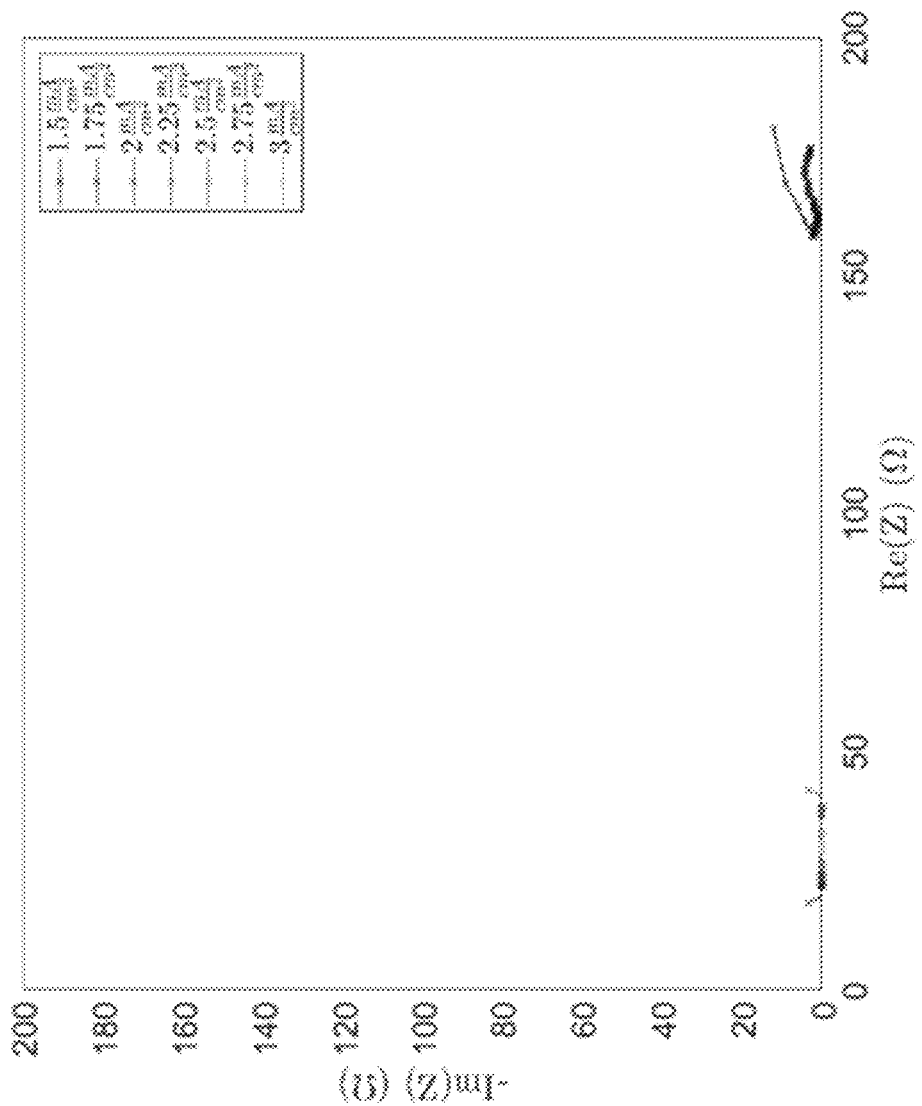
FIG. 10D shows, according to certain embodiments, an EIS spectrum for a NaK(e)-Li/LLZTO/NaK(e)-Li cell at 1.5-3 mA·cm$^{-2}$.
Figure 11A:
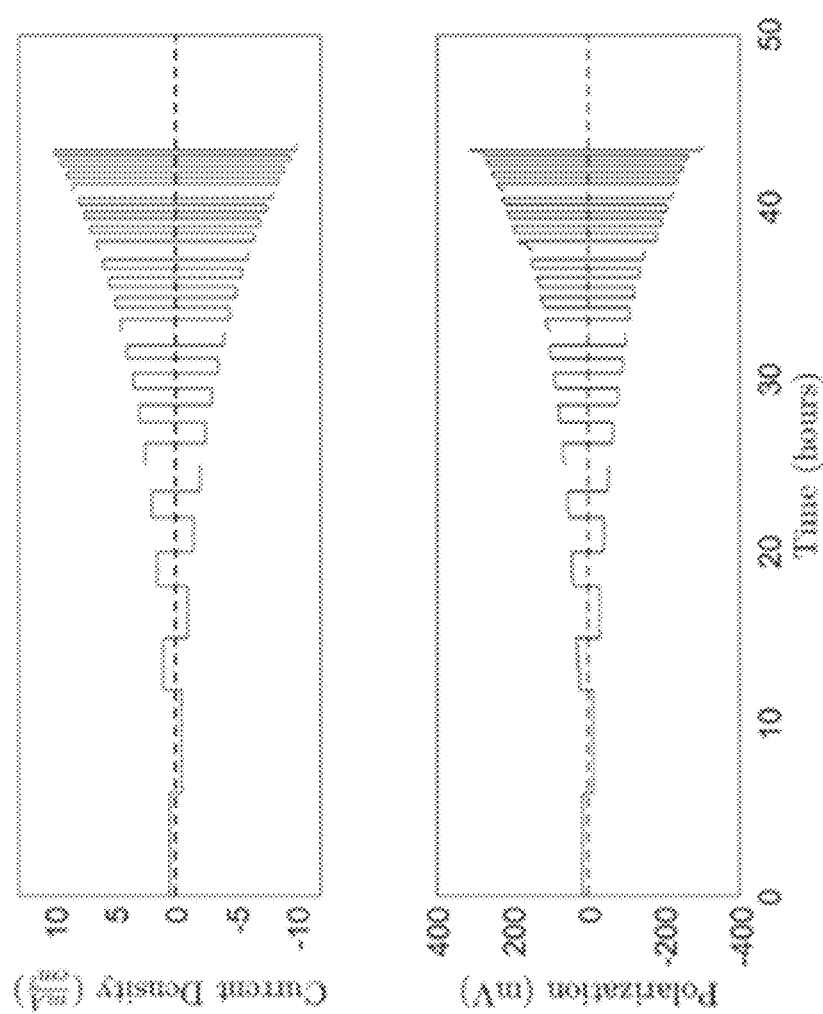
FIG. 11A shows, according to certain embodiments, the voltage time trace and current density time trace for 50 hours for a 95K5Na/KBA/95K5Na cell.
Figure 11B:
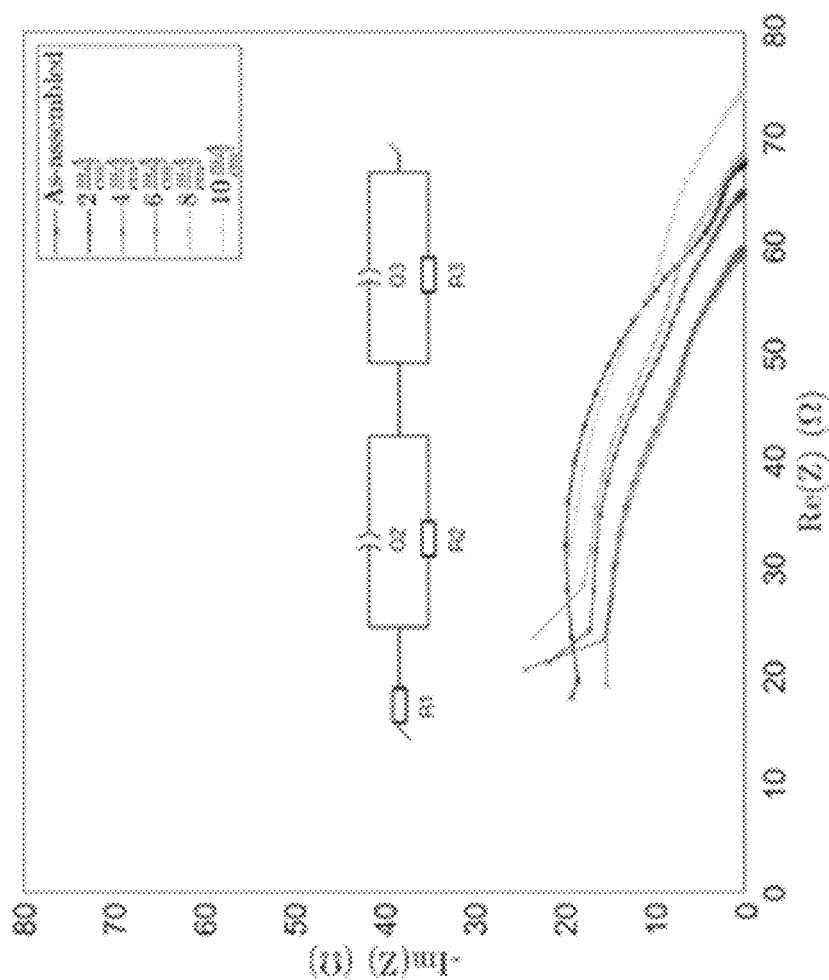
FIG. 11B shows, according to certain embodiments, an EIS spectrum for a 95K5Na/KBA/95K5Na cell at 2-10 mA·cm$^{-2}$.
Figure 11C:
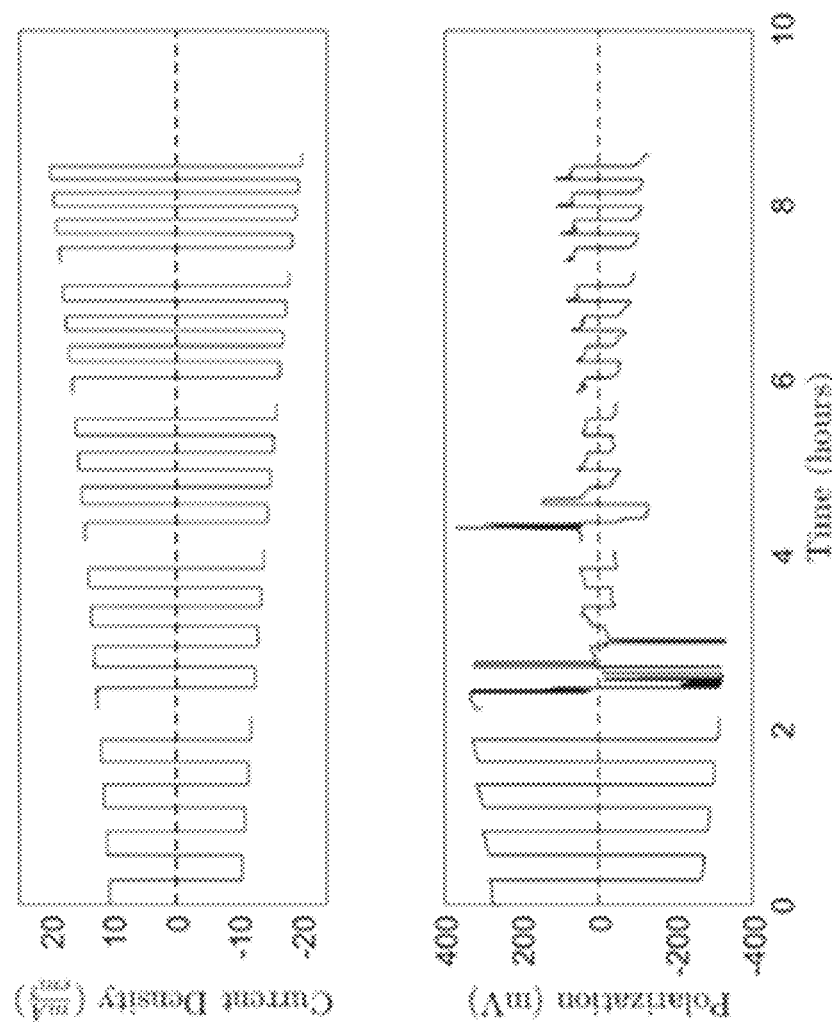
FIG. 11C shows, according to certain embodiments, the voltage time trace and current density time trace for the 10 hours following the data in FIG. 11A for a 95K5Na/KBA/95K5Na cell.
Figure 11D:
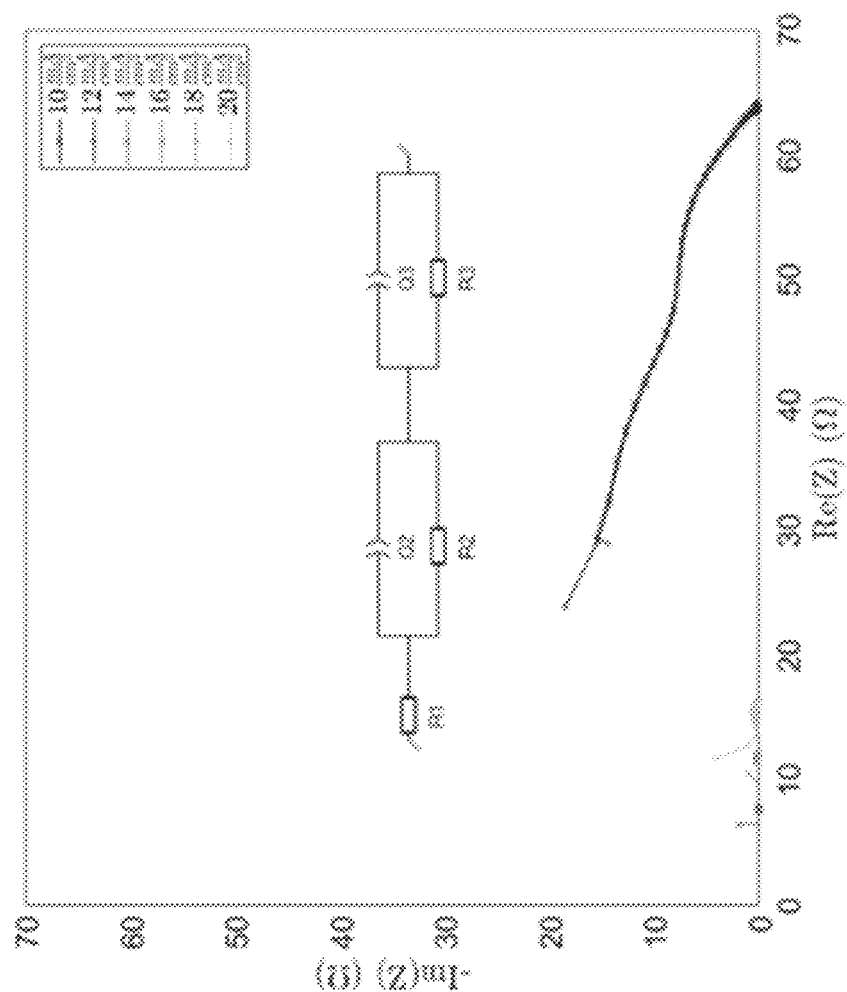
FIG. 11D shows, according to certain embodiments, an EIS spectrum for a 95K5Na/KBA/95K5Na cell at 10-20 mA·cm$^{-2}$.

In the NaK(e)-Li/LLZTO/NaK(e)-Li representative cell, the elapsed time until a short circuit was observed around 60 hours, corresponding to the beginning of the 7th cycle and a cumulative plated lithium thickness of ~360 micrometers. FIG. 10A and FIG. 10C both show the voltage time trace and current density time trace. The sudden drop to zero voltage at ~0 h corresponds to the growth of a metal filled crack completely through the electrolyte disc. EIS spectra measurements (FIG. 10B and FIG. 10D) correspond to a reduction in high frequency resistive impedance and the disappearance of a capacitive component in the EIS spectra, consistent with the formation of a metallic short circuit through the electrolyte. Similar features are observed during electrochemical cycling tests on the representative symmetric 95K5Na/KBA/95K5Na cell, as depicted in FIGS. 11A-11D.

Following the occurrence of an electronic short, the cells were subsequently disassembled and imaged under an optical microscope to examine the electrolyte-electrode interface on both sides of the solid electrolyte. In the NaK(e)-Li/LLZTO/NaK(e)-Li representative cell, the metallic Li electrode is confined within the boundary of the solid electrolyte disc, ruling out the possibility of an electronic short circuit via Li metal on either side of the electrolyte making contact through the sides. This supports the claim inferred from the EIS measurements that the sudden drop in cell impedance is due to an electronic short caused by metal penetration into the solid electrolyte.

During the cell assembly, pre-cycling heat treatment, and cycling process, the area of contact between the Li-metal electrode and LLZTO electrolyte evolves over time due to extrusion or non-uniform Li stripping and plating. This will reduce the true current density relative to the apparent current density based on the initial area. For this reason, "post-mortem area correction" is performed to establish a more accurate value for the critical current density at which a short circuit is observed. For cell Classes 1 and 6, the area is observed to remain relatively constant, corresponding to no great reduction in areal capacity from 3 mAh·cm$^{-2}$. For cell Classes 2-5, the area is observed to increase by a factor of 2-3 between cells, corresponding to a reduction in areal capacity from 3 mAh·cm$^{-2}$ initially to 1-1.5 mA·cm$^{-2}$.

Higher areal capacities were observed during stripping and plating in the "self-healing" electrode approach using interfacial Na—K alloy with Li metal (~3 mAh·cm$^{-2}$, opposed to pure Li itself (~1.5 mAh·cm$^{-2}$). The areal capacity limitations of the pure Li metal cell (Class 1) is attributed to a large impedance rise in later stages of extended unidirectional stripping/plating in which galvanostatic deposition at the desired current density becomes unsustainable. Such a rise in impedance is observed at the 45 hour mark corresponding to the 4$^{th}$ cycle of a Li/LLZTO/Li symmetric cell passing 1.5 mAh/cm$^2$ at 0.5 mA/cm$^2$ (~100 micrometer cumulative Li thickness passed). The impedance rise is indicated by the steep rise in polarization from <200 mV to >750 mV under galvanostatic conditions, demonstrating a sharp rise in cell impedance.

In contrast, a rise in cell impedance is not observed when cycling cells incorporating the "self-healing" electrode approach (Class 6, FIGS. 10A-10D) in which the polarization is kept below 300 mV for ~60 hours, corresponding to the 6$^{th}$ cycle of a cell passing 3.0 mAh/cm$^2$ at 1.5 mA/cm$^2$ (~360 micromter cumulative Li thickness passed). This increase may be attributed to the performance of the "self-healing" of any Li voids formed during stripping by the thermodynamically preferential wetting of Na—K alloy to the LLZTO electrolyte wafer relative to solid Li. In the cells studied, the amount of Na—K alloy applied (5 microliters) corresponds to ~60 micrometers of liquid thickness relative to the electrode area (~0.8 cm$^2$). However, the true liquid layer thickness within the cell is expected to be far below this amount due to the applied stack pressure (1.5 MPa in the majority of cases), with the excess liquid accumulating at the edges of the electrode. Overall, it was found that the performance of the "self-healing" electrode cells did not depend on the applied stack pressure nor the volume of eutectic Na—K alloy applied.

These observations in whole suggest that when considering the mechanism via which solid state battery cells short circuit, the risk of electroactive metal penetration (i.e., during charging of a lithium metal battery) is reduced by utilizing metallic anode with mechanical properties that facilitate yield at the electrode-electrolyte interface. This may be done by the outlined approaches: by using a semi-solid electrode consisting of a solid and a liquid or the utilization of a low-yield stress interface between the electroactive metal and electrolyte. Such strategies may be compelling in the search for high-energy density all solid-state batteries.

Example 2

The following example describes the materials and methods used to fabricate and evaluate the electroactive materials and electrochemical devices.

Electrolyte Acquisition:

The polycrystalline LLZTO, NBA, and KBA sample were obtained from a commercial vendor. (LLZTO: Toshima Manufacturing Inc, Japan, NBA/KBA: Ionotec, Great Britain).

X-Ray Diffraction:

The crystal structure, single crystallinity, and phase purity of the electrolytes were determined via X-ray diffraction (XRD).

Conductivity Measurements:

EIS was performed on symmetric cells incorporating Au blocking electrodes on either side of the solid electrolyte disc using a Bio-Logic VMP-3 cell test system. The Au thin film (~100 nm) was deposited onto the electrolyte via magnetron sputtering. Values for ionic conductivity (and dielectric capacitance) were extrapolated from circuit fitting of resulting EIS spectra.

Sample Surface Preparation and Characterization:

Electrolyte samples were polished using an EcoMet™ 250 Pro Grinder Polisher (Buehler, Lake Bluff, Ill., USA). The samples were first polished using 600 grit size SiC abrasive paper to reveal two faces. The two largest parallel surfaces were polished with diamond abrasive paste of successively finer grit size, to a final grit size of 1 micrometer resulting in a mirror finish. To obtain finely polished faces, the samples were then sequentially polished using aqueous diamond suspensions of 9 micrometer and 1 micrometer particle size, for 25 min and 10 min, respectively. The samples were then sonicated for 5 minutes in deionized water to remove polishing debris.

The scanning electron microscopy (SEM) images are nearly featureless for the polished LLZTO, whereas for the NBA and KBA micrographs a distribution of Zirconia ($ZrO_2$) particles added by the vendor to increase the fracture toughness were observed. Thermal etching of the polished solid electrolytes (1 hour at 500° C., 1000° C., 1000° C. for LLZTO, NBA, and KBA respectively) reveal the grain size to range from 5 to 10 micrometer for all three solid electrolytes. SEM imaging of the samples was conducted using a Merlin GEMINI II SEM (Carl Zeiss Microscopy, Jena, Germany) operating at 15 kV accelerating potential and 215 pA current. All samples were prepared in an argon-filled glovebox (Oxygen and Water levels below 0.1 ppm).

Stylus profilometry was conducted to quantify the roughness of the polished samples. Over a scan length of 5 mm, it was observed that the polished surfaces consistently possess sub-micron surface flaws for all the solid electrolyte samples (with independent measurements taken for three samples per electrolyte class).

Fracture Toughness Measurements Via Vickers Microindentation:

A Vickers micro-indenter (LECO LM248AT Microindentation hardness testing system) was used to place several indents under an applied load enough to produce cracks that emanate from the corners. These cracks have a semicircular crack front that extends normal to the surface into the crystal. By varying the applied load, a range of crack lengths is produced and evaluated by SEM. Indentation loads of 20 N, 10 N, and 5 N were used to determine the fracture toughness in this study. The crack lengths were measured via optical microscopy.

Two independent methods (Anstis and Evans) for evaluating the fracture toughness from indentation data were incorporated. The Anstis method uses a value for Young's Modulus of the indented material, whilst the Evans method is modulus independent. A lower and upper bound of 210 and 300 GPa for the Young's Modulus of Na and K $\beta''$-$Al_2O_3$ was assumed based on previous measurements on undoped $\beta''$-$Al_2O_3$. These values do greatly affect the calculated fracture toughness within the Anstis method. Overall, the data suggests that the fracture toughnesses of the solid electrolytes considered in this study span between the 2-3 MPa·$m_{1/2}$ range with similar magnitudes of variance between samples (3 indents on three independent samples per electrolyte class).

Electrochemical Cell Assembly and X-Ray Photoelectron Spectroscopy (XPS) Analysis:

Prior to assembly, each polished solid electrolyte disc was subjected to wet polishing immediately followed by heat treatment in an inert atmosphere to remove any surface layers on the electrolyte that may result in a high interfacial impedance. LLZTO pellets were subjected to heat treatment at 500° C. for 3 hours to remove $LiCO_3$ and LiGH. The NBA and KBA pellets were subjected to heat treatment at 1000° C. for 1 hour in order to remove any chemisorbed moisture.

Independent XPS elemental survey measurements indicated that a negligible amount of contaminant layers was present on the surface of the solid electrolytes following heat treatment. XPS analysis was performed using a PHI Versaprobe II XPS, (Ultek-PHI, Japan). The monochromated Al K-alpha X-ray source was operated at 50 W with a 200 micrometer spot size. Base pressure during analysis was better than $2.0 \times 10^{-8}$ torr. The primary reactive contaminant with respect to the alkali metals was found to be trace oxygen, which reacts with the metal over time (even in an inert Ar atmosphere) to form their respective oxide, producing a visible film.

Cells of Class 1 were assembled by placing a disc of flat lithium foil (0.375 inch diameter, 0.1 mm thickness, 50 mAh·$cm^{-2}$, ~10 microliter Li) between the LLZTO solid electrolyte and a stainless-steel current collector on either side to complete the cell assembly. The initial area of the lithium electrodes are therefore equal to 0.80 $cm^2$ (compared to the 1.27 $cm^2$ area of the half-inch diameter electrolyte face). Before electrochemical cycling, these cells were heated to 170° C. for 3 hours at an applied stack pressure of 1.5 MPa under a custom spring-loaded fixture. The cells were subsequently slowly cooled to room temperature. We found that this procedure greatly reduced the interfacial impedance of the cell, allowing the application of high current densities (up to 6 mA·$cm^{-2}$), while maintaining cell potentials well below 1.0 V. When assembling "low-pressure" cells, the springs were tightened minimally, with an assumed upper bound of 2% strain based on visual inspection. This upper bounded strain corresponds to a 75 kPa load, assuming linear elasticity of the spring.

Cells of Class 2-4 were assembled by pipetting a 10 microliter drop of molten Na, K, or pre-mixed Na—K alloy onto their respective $\beta''$-$Al_2O_3$ solid electrolyte and flattening the droplet with the steel current collector under an applied stack pressure of 1.5 MPa that was maintained during electrochemical cycling. The initial area of the lithium electrodes is therefore equal to the surface area of the exposed current collector face, which is 0.40 $cm^2$ (compared to the 1.27 $cm^2$ area of the half-inch diameter electrolyte face). No pre-cycling heat treatment was necessary to produce a low impedance cell for testing.

Cells of Class 6 were assembled in a similar manner to those of Class 1 by adding a controlled amount of eutectic Na—K alloy (~5 or 10 microliters of 77 mol. % K, corresponding to ~50 micrometer thickness of NaK alloy) to one face of the punched Li disc (0.375 inch diameter, 0.1 mm thickness, 50 mAh·$cm^2$, ~10 microliter Li). The side of the Li disc with the added Na—K alloy was then placed in contact with the LLZTO solid electrolyte wafer.

Electrochemical Cycling:

Galvanostatic experiments were conducted on the samples using a Bio-Logic VMP-3 cell test system. A total of 40 cells prepared in the above manner were studied at room temperature (22° C.), at two different current density profiles. Li/LLZTO/Li and NaK(e)-Li/LLZTO/NaK(e)-Li were subjected to galvanostatic cycling at 0 to 3 mA·$cm^{-2}$ at 0.125 mA·$cm^{-2}$ increments with an areal capacity of 0.25, 1.5, or 3 mAh·$cm^{-2}$ (2.5, 15, 30 micromter Li plating thickness respectively) per cycle. Na/NBA/Na, K/KBA/K, 95K5Na/KBA/95K5Na, and 90K10Na/KBA/90K10Na cells were subjected to galvanostatic cycling at 0 to 40 mA·$cm^{-2}$ at 0.5 mA·$cm^{-2}$ increments also with an areal capacity of 3 mA·$cm^{-2}$ per cycle (30 and 45 micromter thickness for Na and K, respectively). The current density and areal capacity were defined with respect to the initial area of contact between the alkali metal and solid electrolyte.

Between galvanostatic cycles, EIS spectra were also collected at set intervals (between each cycle for cells i) and vi), and between every 5 cycles for cells ii)-iv)) in order to monitor the state of the electrode-electrolyte interface by examining the evolution of the resistive and capacitive components of the cell over time. Throughout the entire process, the apparatus was housed in an argon-filled glove box with oxygen and water content below 0.1 ppm and 1 ppm, respectively.

Postmortem Characterization:

Optical microscopy was used examine the disassembled symmetric cell after cycling. Upon completion of electrochemical cycling, ex-situ microscopy was conducted using the Leica DMS300 (Leica, Germany) digital microscope.

Sessile Drop Testing:

The surface energies of lithium, sodium, and potassium in contact with various solid electrolytes were evaluated via sessile drop testing. A disk of the substrate of interest (prepared by polishing as indicated above) was placed on a hotplate. The temperature was adjusted to be approximately 20° C. above the melting point of the metal alloy to be tested. A 10 microliter sample of the alloy was drawn from a pipette and deposited onto the center of the substrate disk. The system equilibrated in temperature for 5 minutes while the camera was positioned horizontally facing the droplet and vertically aligned to the top face of the substrate disk. The substrate and drop were covered by a small dome of magnesia ceramic to insulate the testing area. For each measurement, the hotplate was increased by an increment of 20° C., the droplet's temperature was allowed to stabilize for 4 minutes after the hotplate indicated that it had reached the desired temperature, and an image was captured. This procedure was repeated for a total of eight data points for each sample.

Example 3

The following example describes the calculated composition-temperature phase diagrams of three binary Li-alloy systems, Li—Na (FIG. 5A), K—Li (FIG. 5B), and K—Na (FIG. 5C), at 1 atmosphere.

Figure 5B:
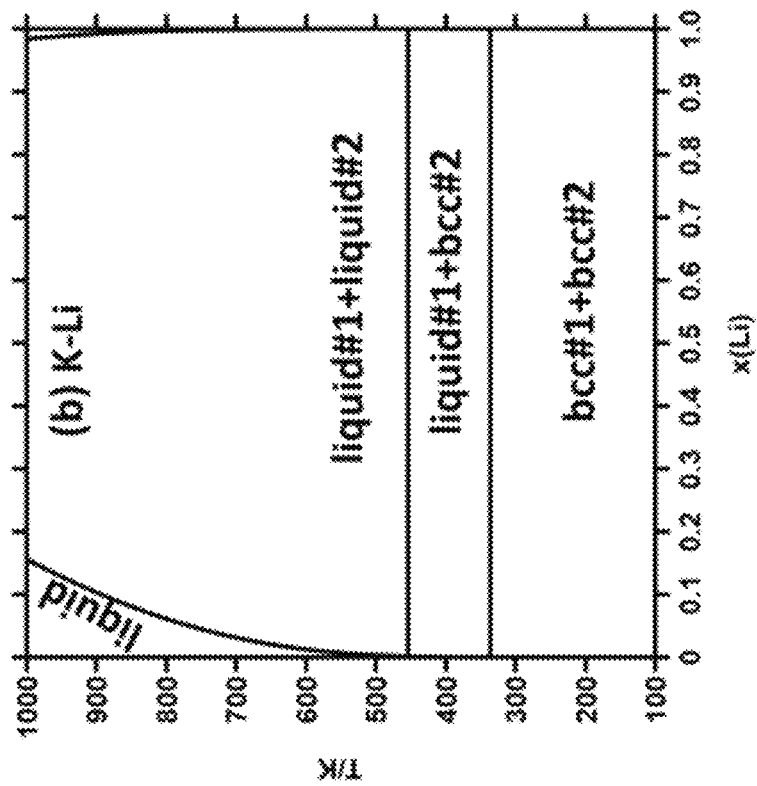
FIG. 5B shows, according to certain embodiments, a composition-temperature phase diagram of a K—Li alloy at 1 atmosphere.
Figure 5A:
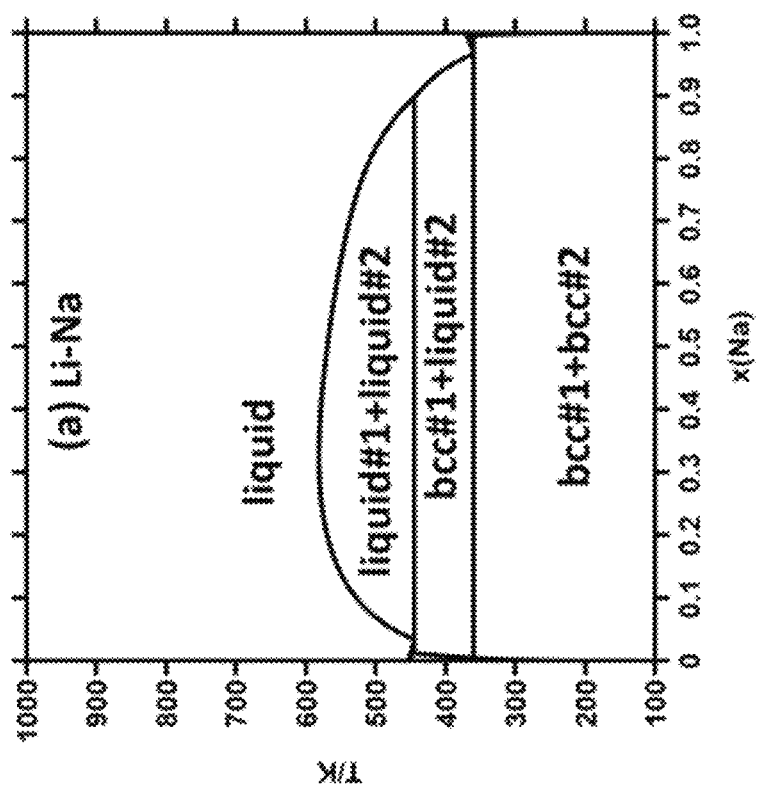
FIG. 5A shows, according to certain embodiments, a composition-temperature phase diagram of a Li—Na alloy at 1 atmosphere.

The phase separation tendency between Li and K is stronger than that between Li and Na, possibly due to larger atomic size mismatch between Li and K. At ambient pressure and below about 450 K, Li metal co-exists with nearly-pure solid Na below ~360 K, as shown in FIG. 5A, or nearly-pure solid K below ~340 K, as shown in FIG. 5B. Below these temperatures, which represent practical use temperatures for many battery applications, a Li—Na or Li—K anode consists of a harder Li and a softer Na or K phase. The composition of the anode traverses the phase fields in FIG. 5A and FIG. 5B during use; for instance if the working ion is Li$^+$, in the discharged state the anode will be depleted of Li, and therefore softer. Such composites may have mechanical behavior permitting higher current densities in a cell that uses a lithium-conducting solid electrolyte.

Figure 5C:
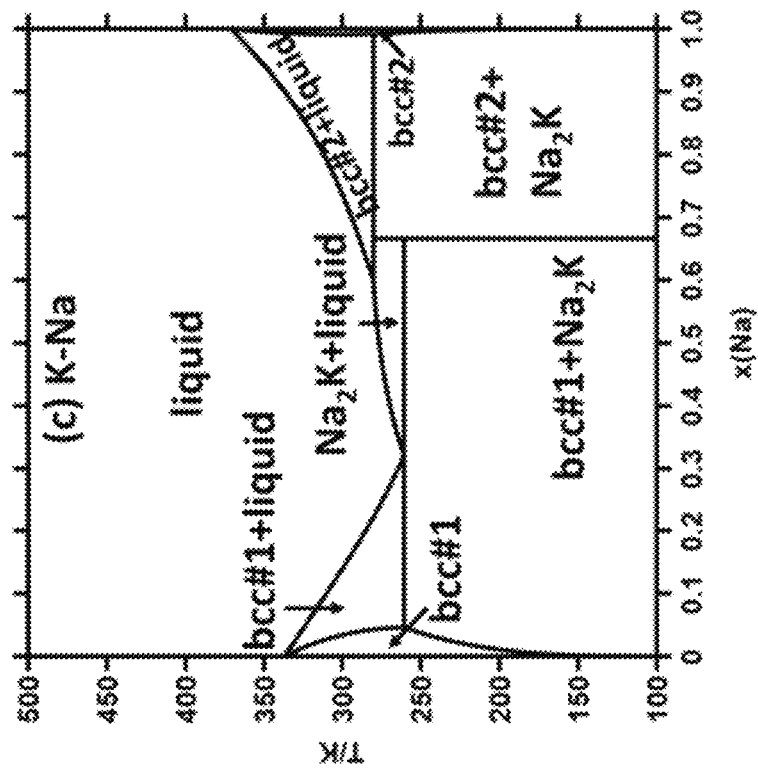
FIG. 5C shows, according to certain embodiments, a composition-temperature phase diagram of a K—Na alloy at 1 atmosphere.

As discussed earlier, a still softer composite exists if the solid Li phase coexists with a small amount of liquid. This type of anode is analogous to a dental amalgam. In FIGS. 5A and 5B, such a co-existence occurs between 450 K and the solidus temperatures of ~360 K and ~340 K, respectively. FIG. 5C shows that there is no liquid miscibility gap between Na and K, in contrast to the cases of Li—Na and Li—K, and is instead a deep eutectic extending to ~260 K. In the ternary system, Li co-exists with a liquid rich in Na and K, and that this two-phase coexistence can be engineered to span the operating temperature range of interest for electric vehicle applications.

Example 4

Figure 6:
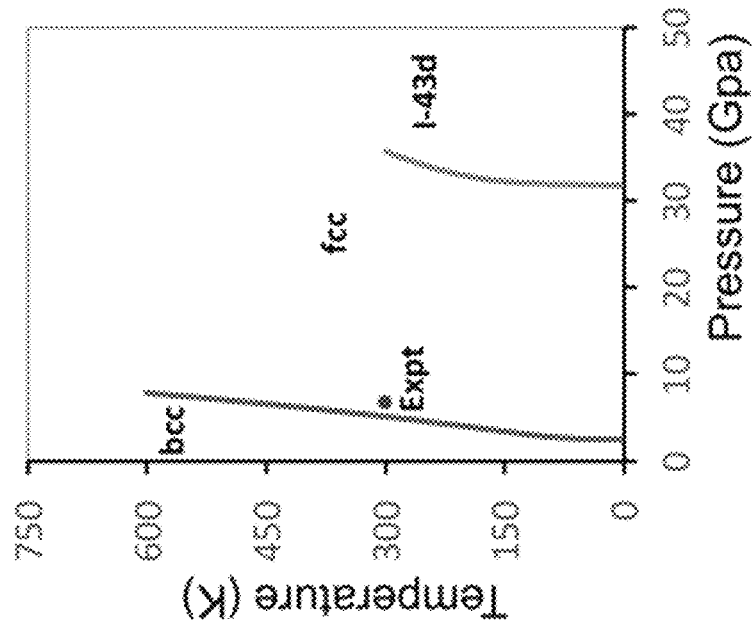
FIG. 6 shows, according to certain embodiments, a pressure-temperature phase diagram of Li.

The following example describes the calculated pressure-temperature phase diagram of Li (FIG. 6).

An important variable to consider for the state of matter is pressure, since the pressure generated during electrodeposition, especially at small-scale features such as cracks, pores, and grain boundaries, can be very high. The pressure-temperature phase diagrams for pure metals Li, Na, and K are known. The "simple" alkali metals exhibit complicated behaviors with pressure. These three elements all crystallize in the bcc structure under ambient pressures and transform to the fcc structure when pressure increases. They also show an unusual behavior with pressure, i.e, transforming from solid to liquid with increasing pressure in a certain range. One possible explanation is that quantum effects are starting to play the dominant role at high compression. Another interesting phenomenon is that although Na has a lower melting point than Li under ambient pressures, it has a much higher melting point under high pressures (~1000 K at ~30 GPa).

The pressure-temperature phase diagram of Li was calculated using density functional theory (DFT) calculations and a simple Debye model for estimating free energies, as shown in FIG. 6. The low pressure region of the phase diagram is in good agreement with known values, but in the high pressure region, the phase boundary between fcc and the cI16 (space group I-43d) phase was predicted correctly only near 0 K, The Debye model, which is often successful for metals under ambient pressures, fails for describing the solids under high pressures. The unusual thermodynamic behavior of Li under high pressures is further exemplified by its phonon instability emergent under pressure.

While the understanding of thermodynamics in alloy systems containing Li, Na, and K under non-ambient pressure is still lacking, it is hypothesized that pressure will improve the alloying ability between Li and Na/K, if the atomic size mismatch is indeed the dominant factor determining alloying. Since Na and K have much lower bulk modulus than Li, their compression under pressure will reduce the atomic size mismatch between them and Li.

Example 5

The following example describes the lithium deposition process and the effect of external stress on dendrite growth.

In order to understand the lithium deposition process and the effect of external stress on dendrite growth, phase-field simulations of the electrodeposition process coupled with mechanics were used to understand the mechanical response at the electrode-solid electrolyte interface. The morphological evolution of the metal electrode during electrodeposition is studied using phase-field simulations. The simulations entail real-time metal electrodeposition with a timescale and length scale that is comparable to the experimental observations. The incorporation of electric-chemical-mechanical driving forces into the framework enables the influence of intrinsic material parameters and externally applied forces (e.g., stack pressure) on the suppression of dendritic growth to be pinpointed. Moreover, phase-field simulations also provide a handle on the underlying physics of dendrite growth.

Figure 7B:
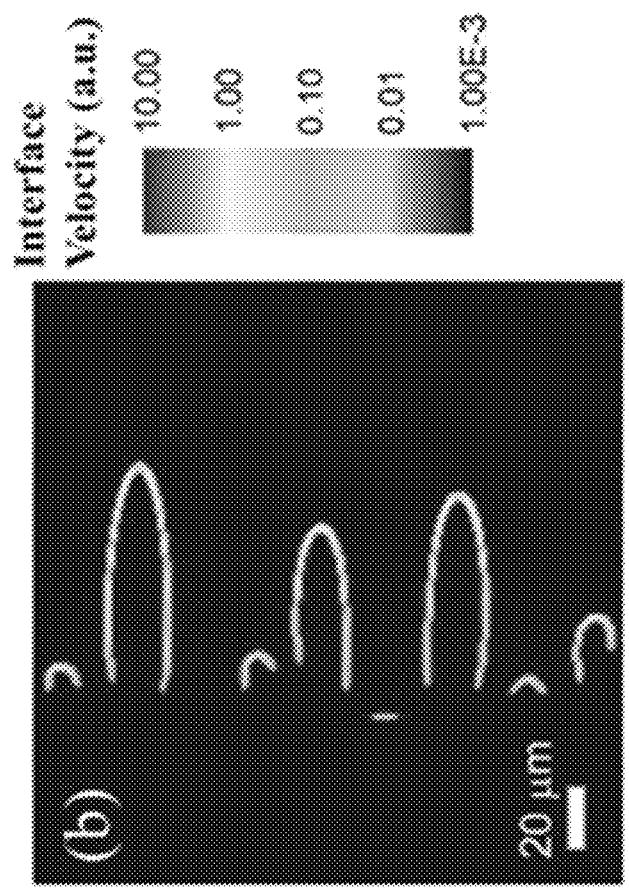
FIG. 7B shows, according to certain embodiments, a phase-field simulation of the distribution of the interface velocity in the dendrite tip.
Figure 7A:
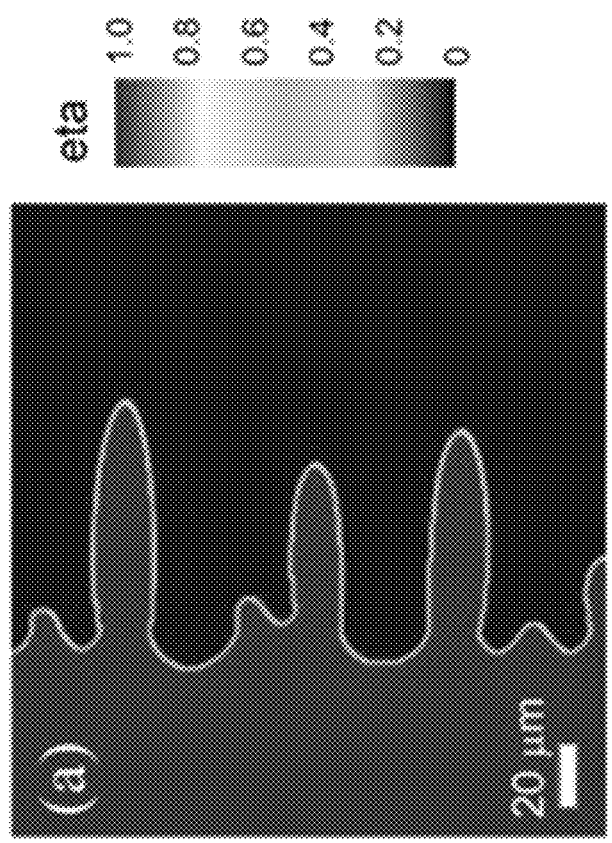
FIG. 7A shows, according to certain embodiments, a phase-field simulation of electrode morphology after electrodeposition under large applied current densities.
Figure 7D:
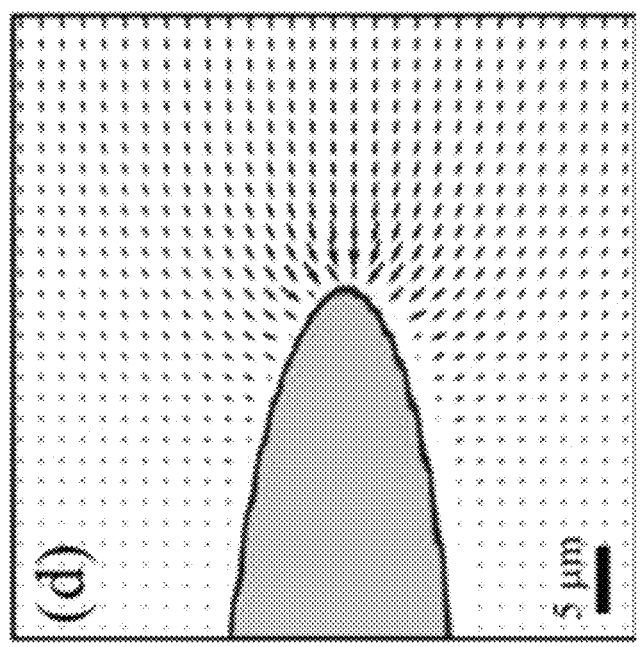
FIG. 7D shows, according to certain embodiments, a two-dimensional electric field vector distribution surrounding a dendrite.
Figure 7C:
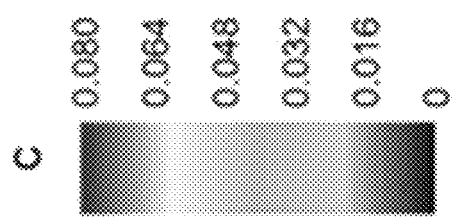
FIG. 7C shows, according to certain embodiments, a phase-field simulation of the distribution of the Li-ion molar fraction surrounding the dendrite tip.
Figure 7C:
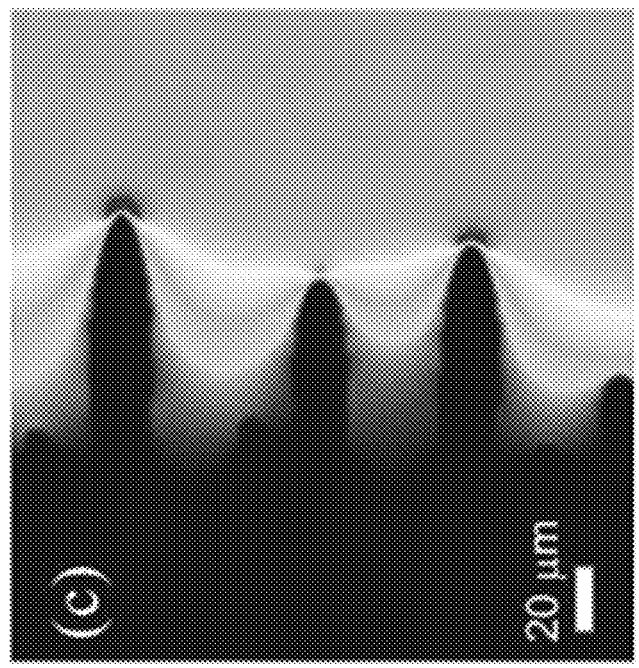

The phase-field simulations of lithium metal deposition with a liquid electrolyte are shown in FIGS. 7A-7D. Long needle-like dendrites form under relatively large current densities. The formation of dendrites leads to the accumulation of lithium ions around the dendrite tip, which further promote the growth of the dendrite tip region. In contrast, in the concave region, the lithium ions are drained by the growth of the dendrite tip, leading to a much smaller interface velocity in these regions. The spatially resolved electric field distribution is also shown in FIG. 7D, which demonstrates that the electric field vector is pointing towards the dendrite tip, leading to the further convection of lithium ions to the tip.

Mechanical stresses at the interface are an effective way for suppressing dendrites with solid electrolytes. The influence of the mechanical properties of electrode and electrolyte, along with applied stack pressure, is evaluated by employing a mechanical force balance equation within the phase-field model. The kinetic reaction rate is directly related to the change of the chemical potential due to the presence of the local stress. The compressive stress on the dendrite leads to a lower kinetic rate, which is expected to suppress the growth of the dendrite.

Figure 8B:
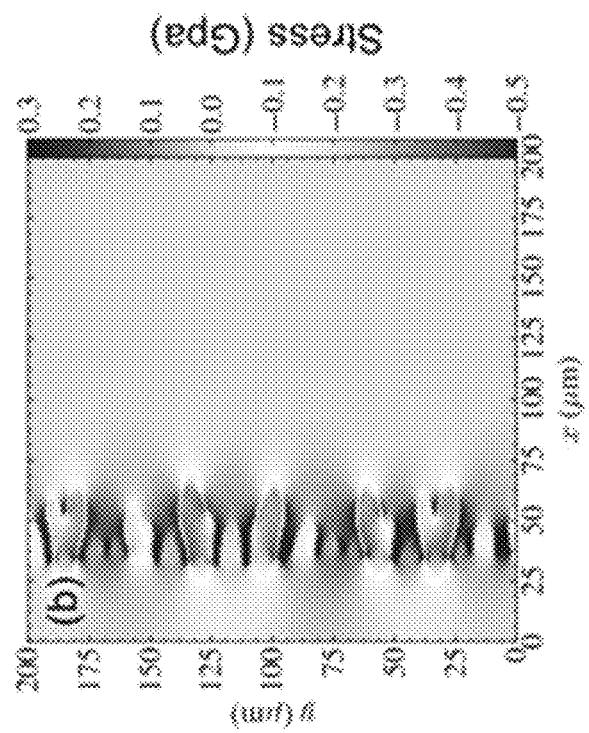
FIG. 8B shows, according to certain embodiments, a diagram of the distribution of normal stress.
Figure 8C:
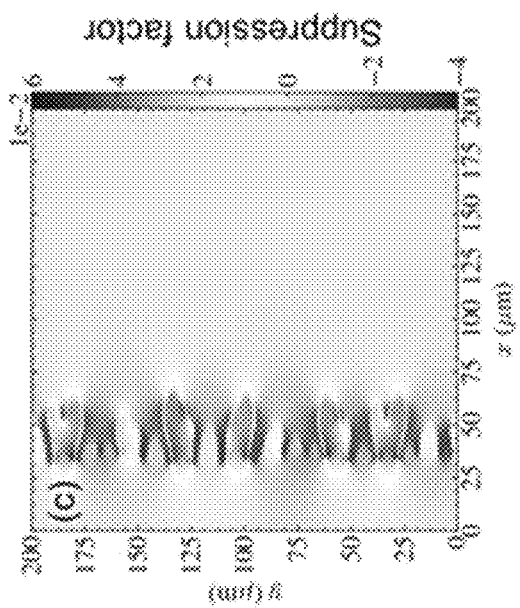
FIG. 8C shows, according to certain embodiments, a diagram of the distribution of the suppression factor.
Figure 8A:
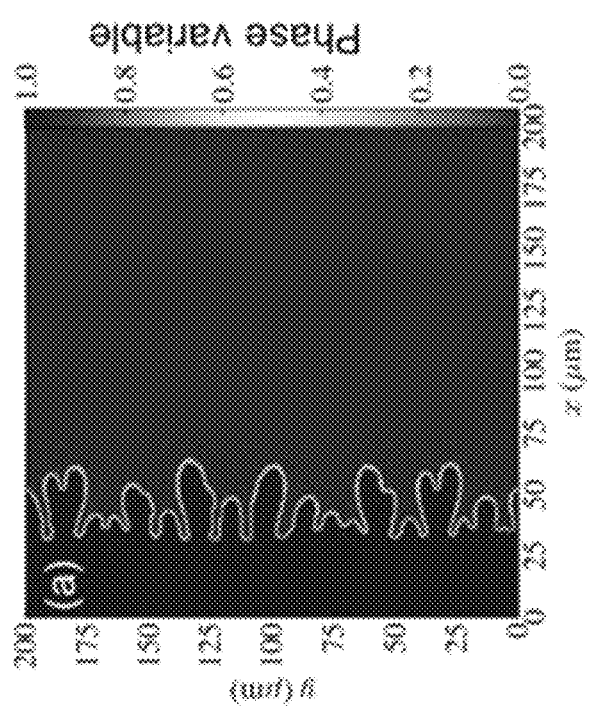
FIG. 8A shows, according to certain embodiments, a phase variable diagram of the electrode morphology of a metal electrode with dendrites.
Figure 9A:
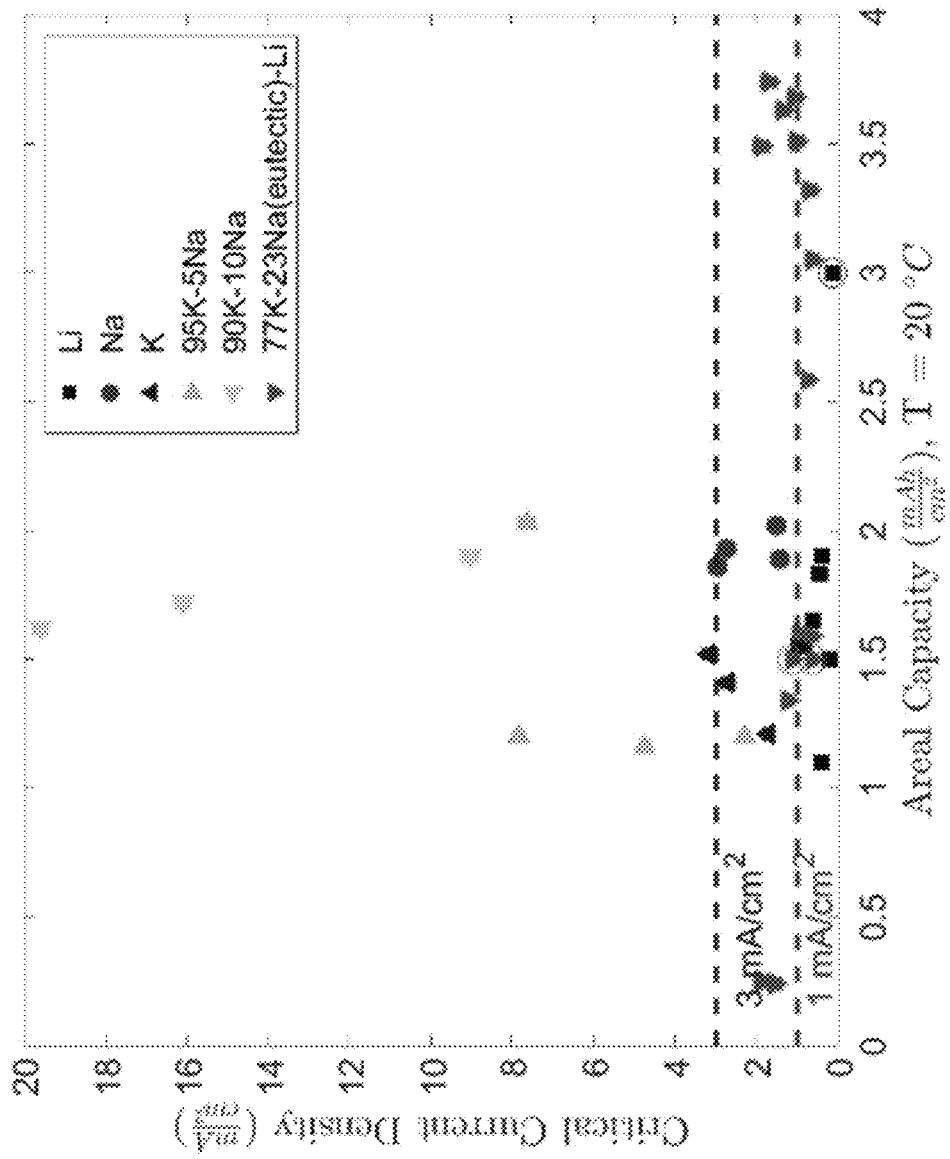
FIG. 9A shows, according to certain embodiments, critical current densities for symmetric cells vs. areal capacity.
Figure 9B:
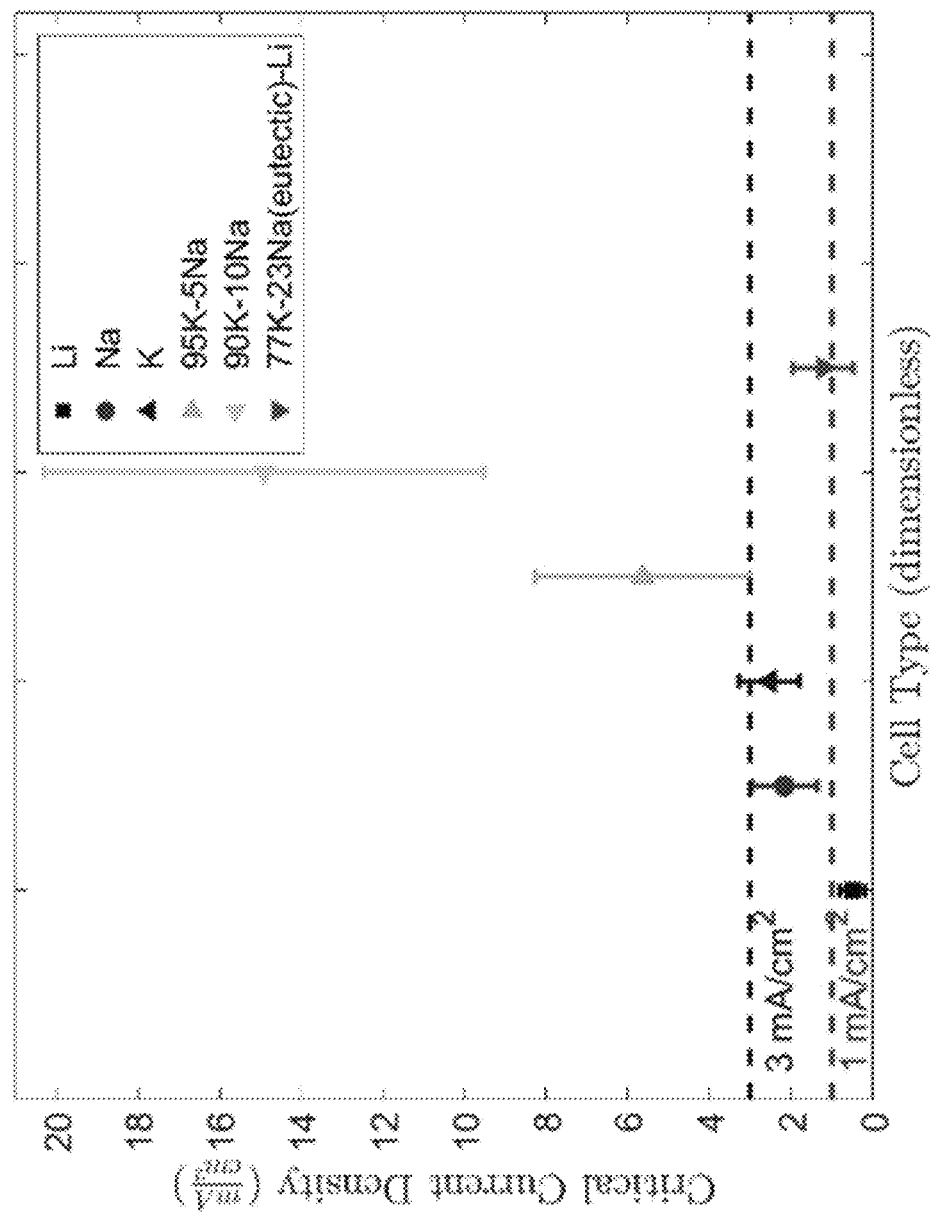
FIG. 9B shows, according to certain embodiments, average critical current densities for symmetric cells, ignoring areal capacity.
Figure 9C:
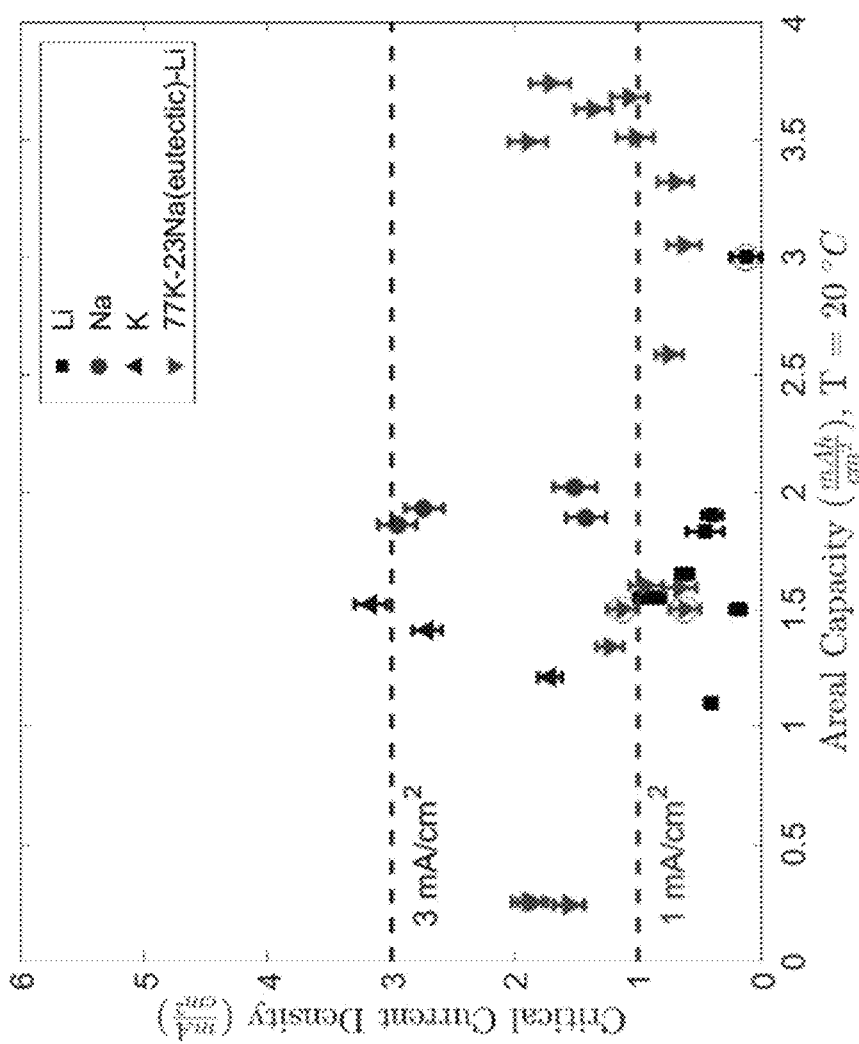
FIG. 9C shows, according to certain embodiments, critical current densities for symmetric cells vs. areal capacity on a zoomed y-axis scale as compared to FIG. 9A.
Figure 9D:
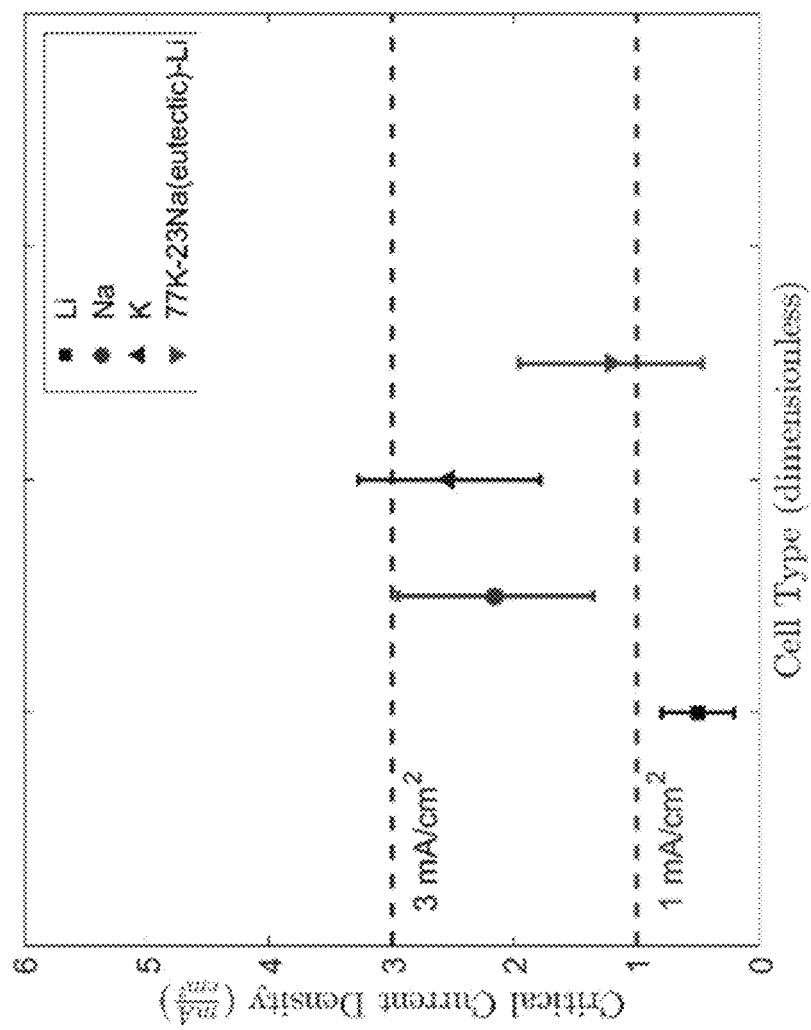
FIG. 9D shows, according to certain embodiments, average critical current densities for symmetric cells, ignoring areal capacity on a zoomed y-axis scale as compared to FIG. 9B.

Results of the internal stress due to the formation of dendrites with a solid electrolyte are shown in FIGS. 8A-8C. Without external stress, large compressive stress is generated in the dendrite region, while tensile stress is generated in the solid electrolyte. This indicates that the large volume expansion during the electrodeposition tends to be counterbalanced by the deformation of the solid electrolyte. In particular, it is interesting that the roots or conjunctions of the dendrites have higher stress, which suggests that these regions are easier to "peel off" during cycling, causing a drop in coulombic efficiency. Further, due to the internal stress generated, the growth of the dendrite is suppressed (positive suppression factor) while the growth of the concave is favored (negative suppression factor), giving rise to a phenomenon of "intrinsic suppression" of dendrite growth.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical device comprising:
a current collector;
a solid electrode disposed on the current collector, wherein the solid electrode comprises one or more alkali metals; and
an interfacial layer comprising an alloy disposed on the solid electrode, wherein the alloy comprises one or more alkali metals, wherein at least one alkali metal of the solid electrode and at least one alkali metal of the alloy are a same alkali metal such that the solid electrode and the alloy include different proportions of the same alkali metal, wherein the alloy comprises either: (i) a liquid phase when the alloy is at a temperature between or equal to 15° C. and 30° C.; or (ii) a solid phase and the liquid phase when the alloy is at the temperature between or equal to 15° C. and 30° C., and wherein the electrochemical device is configured such that the interfacial layer is disposed at an interface between the solid electrode and an electrolyte.

2. The electrochemical device of claim 1, wherein the alloy comprises at least two alkali metals.

3. The electrochemical device of claim 1, wherein the alloy comprises lithium (Li), sodium (Na), and/or potassium (K).

4. The electrochemical device of claim 1, wherein a ratio of the solid phase to the liquid phase in the alloy is at least 50%.

5. The electrochemical device of claim 1, wherein a ratio of the solid phase to the liquid phase in the alloy is at least 80%.

6. The electrochemical device of claim 1, wherein the liquid phase comprises Li, Na, and/or K.

7. The electrochemical device of claim 1, wherein the solid phase comprises Li, Na, and/or K.

8. The electrochemical device of claim 1, wherein the solid phase comprises Li in an amount greater than or equal to 50 mol. % based on a total number of moles in the solid phase.

9. The electrochemical device of claim 1, wherein the solid phase comprises Li in an amount greater than or equal to 90 mol. % based on a total number of moles in the solid phase.

10. The electrochemical device of claim 1, wherein the solid phase comprises Li and the liquid phase comprises Li, and the solid phase comprises a greater mol. % of Li than the liquid phase, based on a total number of moles in the alloy.

11. The electrochemical device of claim 1, wherein the solid phase comprises Na and the liquid phase comprises Na, and the solid phase comprises a greater mol. % of Na than the liquid phase, based on a total number of moles in the alloy.

12. The electrochemical device of claim 1, wherein the solid phase comprises K and the liquid phase comprises K, and the solid phase comprises a greater mol. % of K than the liquid phase, based on a total number of moles in the alloy.

13. The electrochemical device of claim 1, wherein the electrochemical device is a battery.

14. An electroactive material comprising:
a solid electrode comprising one or more alkali metals; and
an interfacial layer comprising an alloy disposed on the solid electrode, wherein the alloy comprises two or more alkali metals, wherein at least one alkali metal of the solid electrode and at least one alkali metal of the alloy are a same alkali metal such that the solid electrode and the alloy include different proportions of the same alkali metal, and wherein the alloy comprises either:
(i) a liquid phase when the alloy is at a temperature between or equal to 15° C. and 30° C.; or (ii) a solid phase and the liquid phase when the alloy is at the temperature between or equal to 15° C. and 30° C.

15. The electroactive material of claim 14, wherein the two or more alkali meals are selected from the group consisting of Li, Na, and K.

16. The electrochemical device of claim 1, wherein the electrolyte is a solid electrolyte.

17. The electrochemical device of claim 16, wherein the solid electrolyte is LLZTO.

18. The electrochemical device of claim 1, wherein a thickness of the interfacial layer is less than or equal to 60 micrometers.

19. The electrochemical device of claim 1, wherein the alloy comprises Na and K.

20. The electrochemical device of claim 1, wherein the solid electrode is a first electrode and the electrochemical device comprises a second electrode, wherein the interfacial layer is disposed between the first electrode and the second electrode.

21. The electrochemical device of claim 20, further comprising the electrolyte, and wherein the electrolyte is disposed between the first electrode and the second electrode.

22. The electrochemical device of claim 1, wherein the alloy is configured such that an atomic ratio of the solid phase to the liquid phase changes during operation of the electrochemical device.

23. The electrochemical device of claim 22, wherein the atomic ratio of the solid phase to the liquid phase changes by less than or equal to 30% and greater than or equal to 1% during operation of the electrochemical device.

24. The electrochemical device of claim 1, wherein the same alkali metal is Li.

25. The electroactive material of claim 14, wherein the same alkali metal is Li.

* * * * *